(12) United States Patent
Shim

(10) Patent No.: US 12,313,827 B2
(45) Date of Patent: May 27, 2025

(54) OPTICAL SYSTEM AND CAMERA MODULE COMPRISING SAME

(71) Applicant: LG INNOTEK CO., LTD., Seoul (KR)

(72) Inventor: Hyung Rok Shim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 448 days.

(21) Appl. No.: 17/777,388

(22) PCT Filed: Nov. 11, 2020

(86) PCT No.: PCT/KR2020/015770
§ 371 (c)(1),
(2) Date: May 17, 2022

(87) PCT Pub. No.: WO2021/101158
PCT Pub. Date: May 27, 2021

(65) Prior Publication Data
US 2022/0404597 A1  Dec. 22, 2022

(30) Foreign Application Priority Data

Nov. 18, 2019 (KR) .......... 10-2019-0147738
Nov. 2, 2020 (KR) .......... 10-2020-0144510

(51) Int. Cl.
*G02B 15/20* (2006.01)
*G02B 15/14* (2006.01)
*G03B 5/02* (2021.01)

(52) U.S. Cl.
CPC .......... *G02B 15/20* (2013.01); *G02B 15/144* (2019.08); *G03B 5/02* (2013.01)

(58) Field of Classification Search
CPC .......... G02B 15/20; G03B 5/02
USPC .......... 359/676
See application file for complete search history.

(56) References Cited

U.S. PATENT DOCUMENTS 8,339,712 B2 * 12/2012 Hayakawa .......... G02B 15/173
359/676
2004/0130647 A1  7/2004 Kuba
2009/0310227 A1 * 12/2009 Ueda .............. G02B 15/144507
359/686
2012/0127585 A1 * 5/2012 Peng .................... G02B 13/004
359/687
2012/0176685 A1 * 7/2012 Sato ............... G02B 15/144113
359/684

(Continued)

FOREIGN PATENT DOCUMENTS

| JP | 2002-131639 A | 5/2002 |
|---|---|---|
| JP | 2008-96559 A | 4/2008 |

(Continued)

*Primary Examiner* — Wyatt A Stoffa
*Assistant Examiner* — Seth D Moser
(74) *Attorney, Agent, or Firm* — Birch, Stewart, Kolasch & Birch, LLP

(57) ABSTRACT

A zoom optical system according to an embodiment of the present invention includes a first lens group, a second lens group, a third lens group, and a fourth lens group which are sequentially disposed in a direction from an object side to an image side, wherein the second lens group and the third lens group are movable, a total track length (TTL) is less than 20 mm, and an effective focal length (EFL) in a telephoto is greater than 25 mm.

19 Claims, 21 Drawing Sheets

(56) References Cited

U.S. PATENT DOCUMENTS

| | | | |
|---|---|---|---|
| 2012/0212836 A1 | 8/2012 | Hsieh et al. | |
| 2015/0168677 A1 | 6/2015 | Lee et al. | |
| 2015/0309328 A1 | 10/2015 | Takakubo | |
| 2017/0038566 A1* | 2/2017 | Shibayama | G03B 3/00 |
| 2019/0212525 A1* | 7/2019 | Abe | G02B 13/06 |
| 2019/0324236 A1* | 10/2019 | Kim | G02B 15/177 |
| 2020/0026094 A1* | 1/2020 | Miwa | G02B 15/143101 |
| 2022/0276473 A1* | 9/2022 | Chen | G02B 13/0035 |
| 2023/0023354 A1* | 1/2023 | Yao | G02B 15/144113 |

FOREIGN PATENT DOCUMENTS

| | | |
|---|---|---|
| JP | 2015-60088 A | 3/2015 |
| JP | 2016-4076 A | 1/2016 |
| JP | 2016-14819 A | 1/2016 |
| JP | 2016-173529 A | 9/2016 |
| JP | 2018-180024 A | 11/2018 |
| JP | 2018-205332 A | 12/2018 |
| KR | 10-2010-0024860 A | 3/2010 |
| KR | 10-2014-0003368 A | 1/2014 |
| KR | 10-2015-0070858 A | 6/2015 |
| KR | 10-2019-0005571 A | 1/2019 |
| TW | 201329504 A1 | 7/2013 |

* cited by examiner

[FIG. 1]
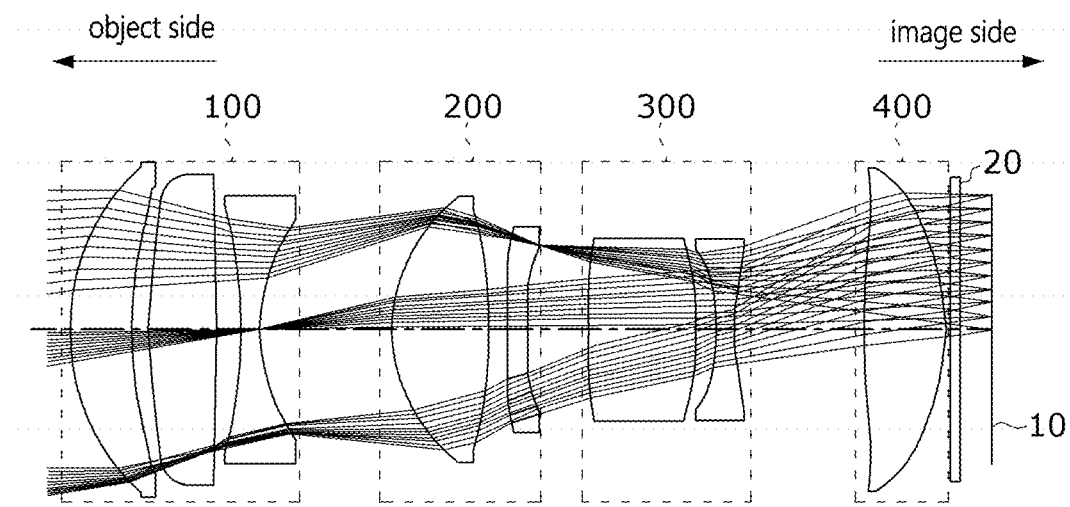

[FIG. 2A]
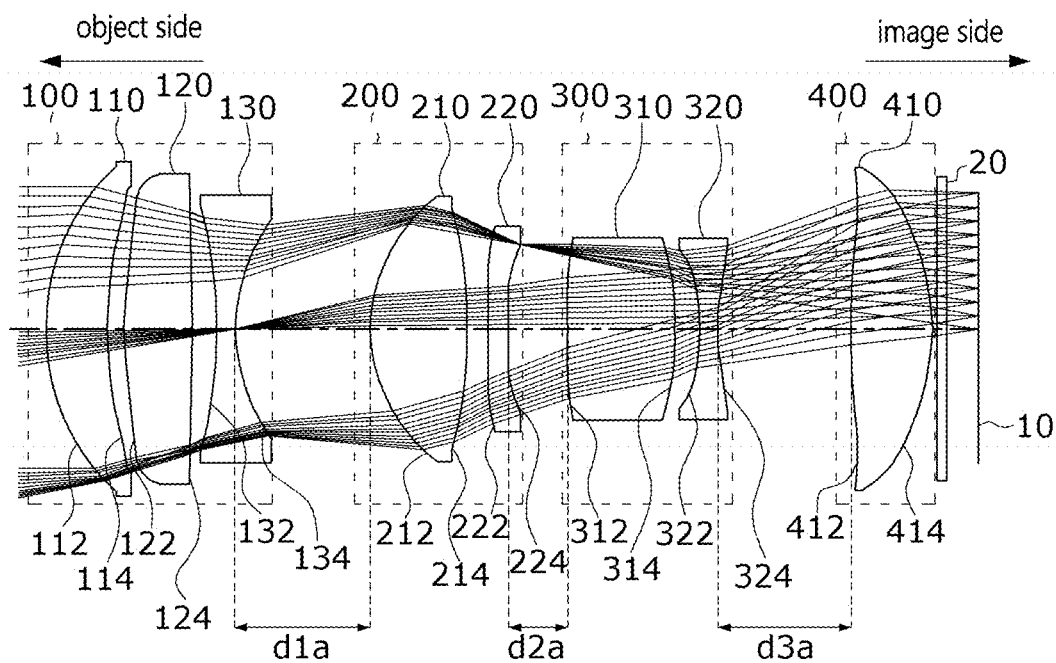

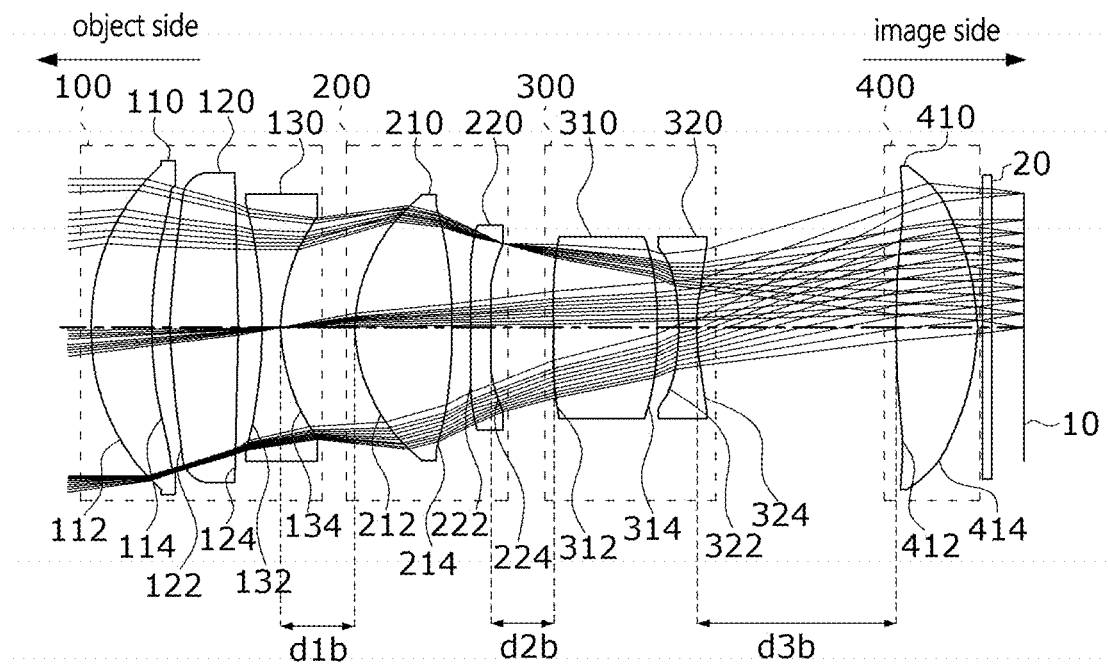
[FIG. 2B]

[FIG. 2C]
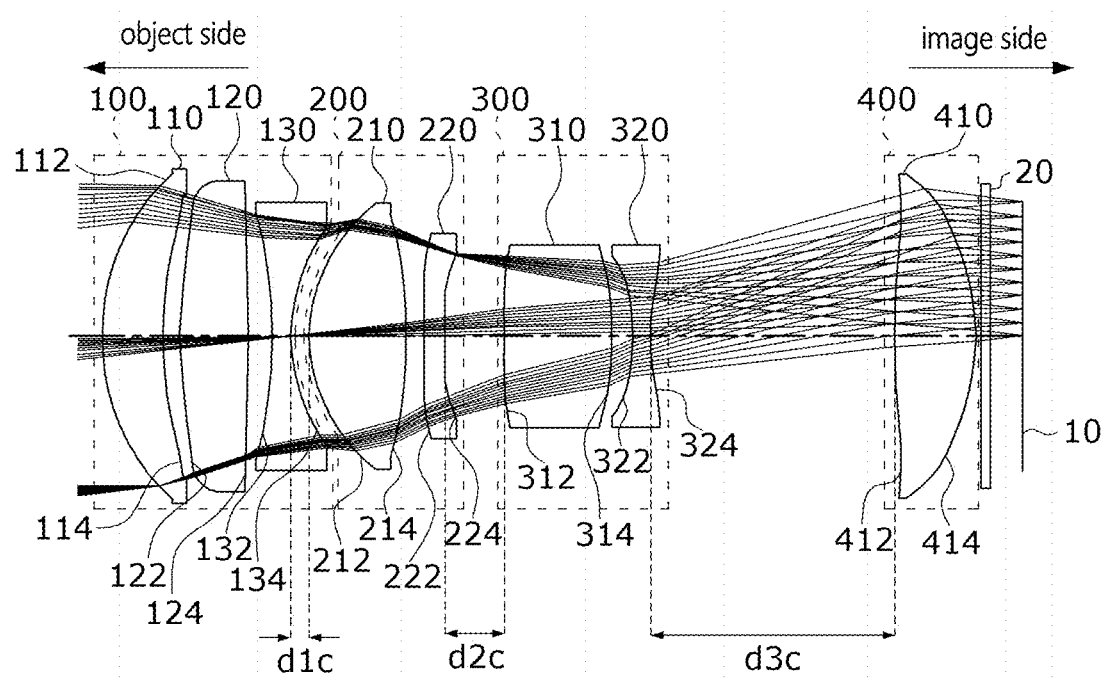

[FIG. 3A]
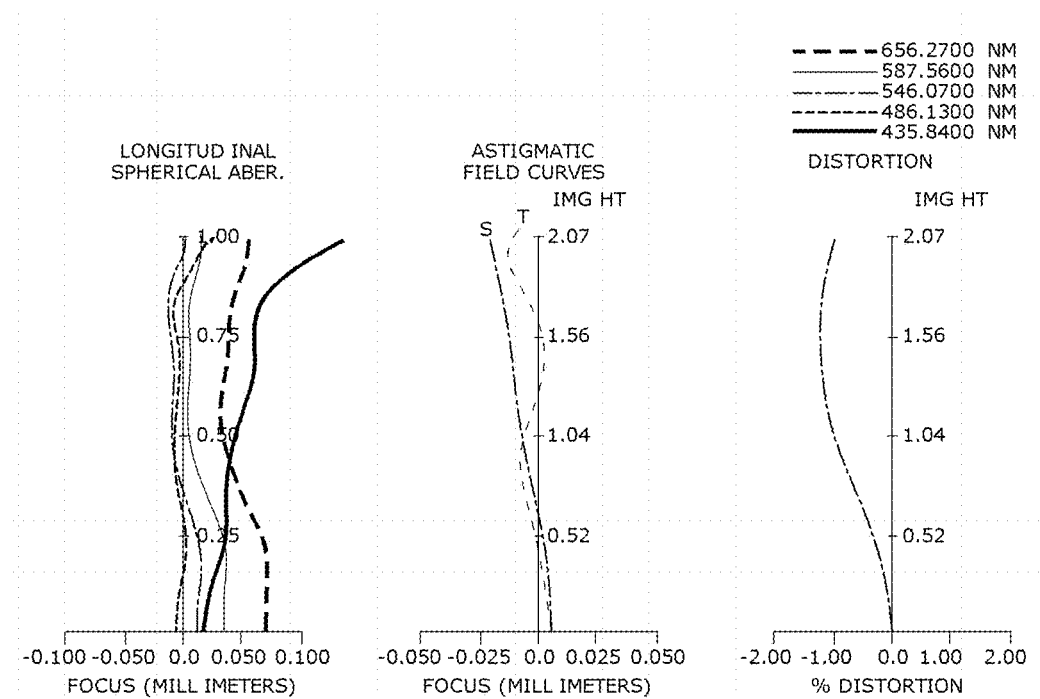

[FIG. 3B]
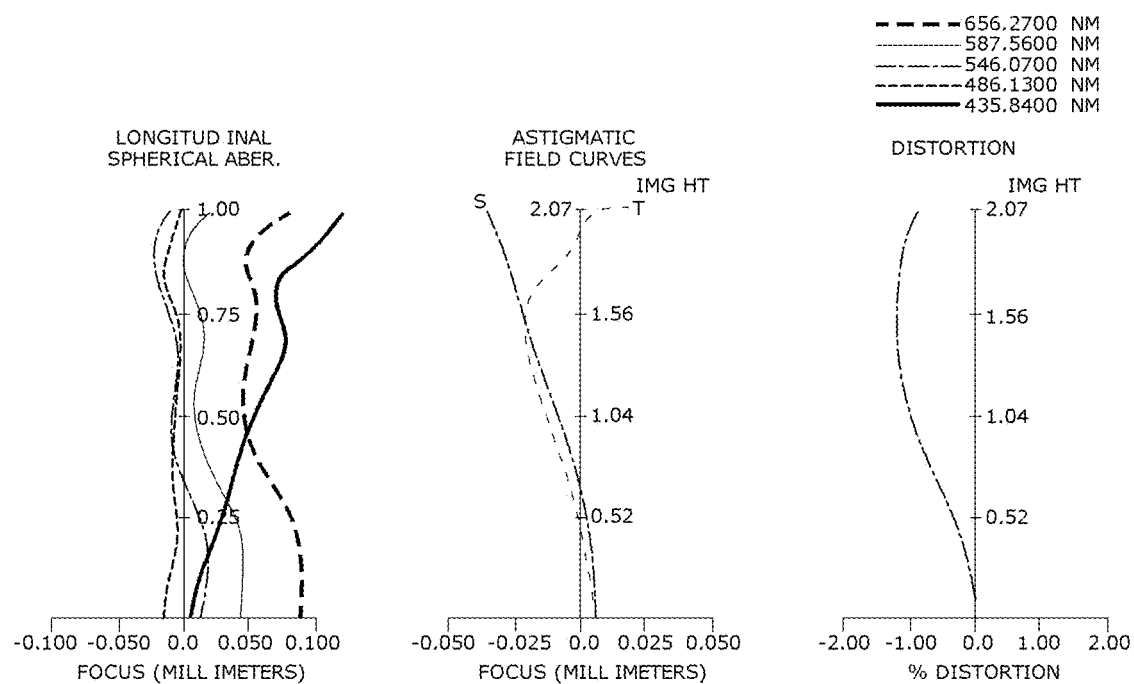

[FIG. 3C]
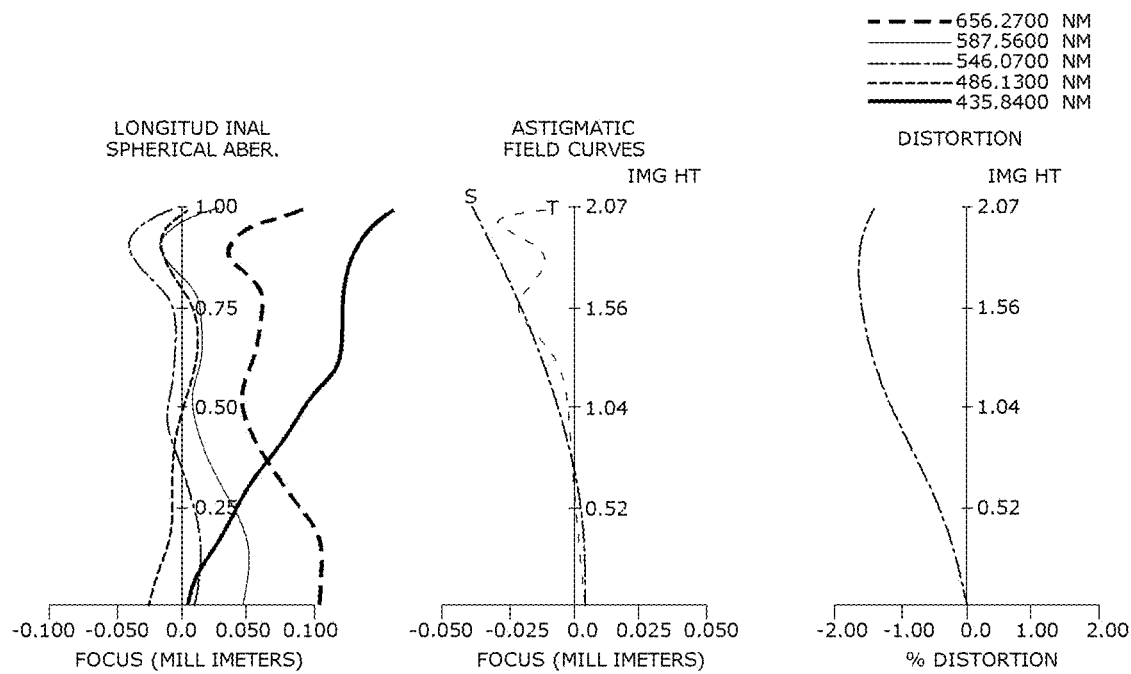

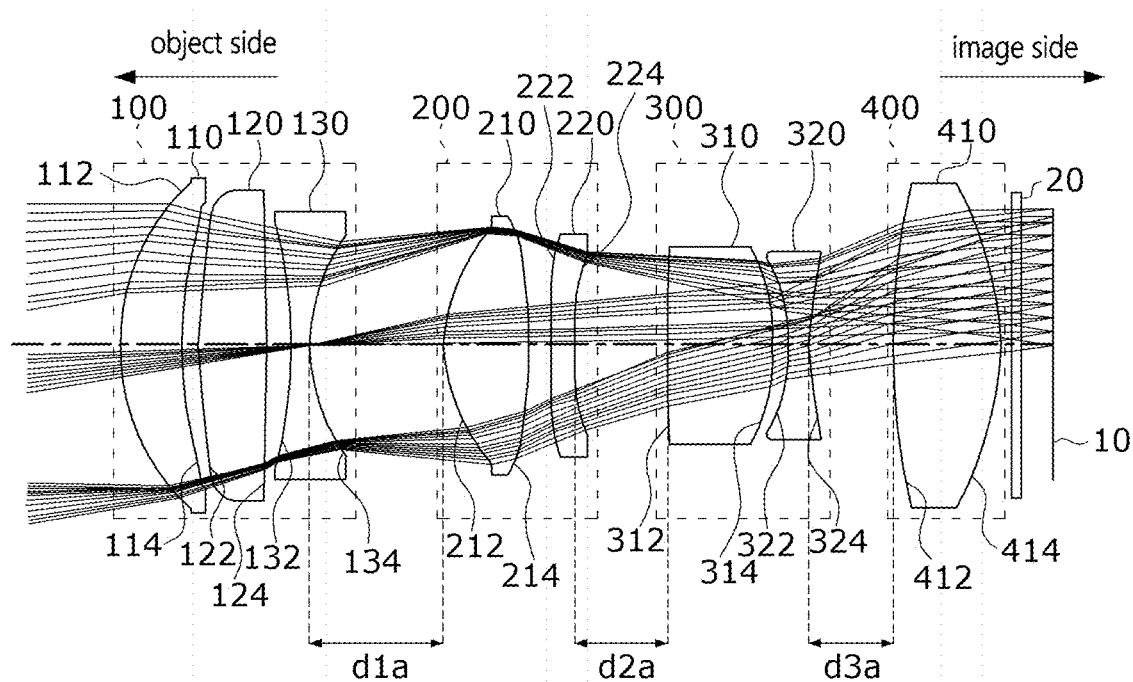
[FIG. 4A]

[FIG. 4B]
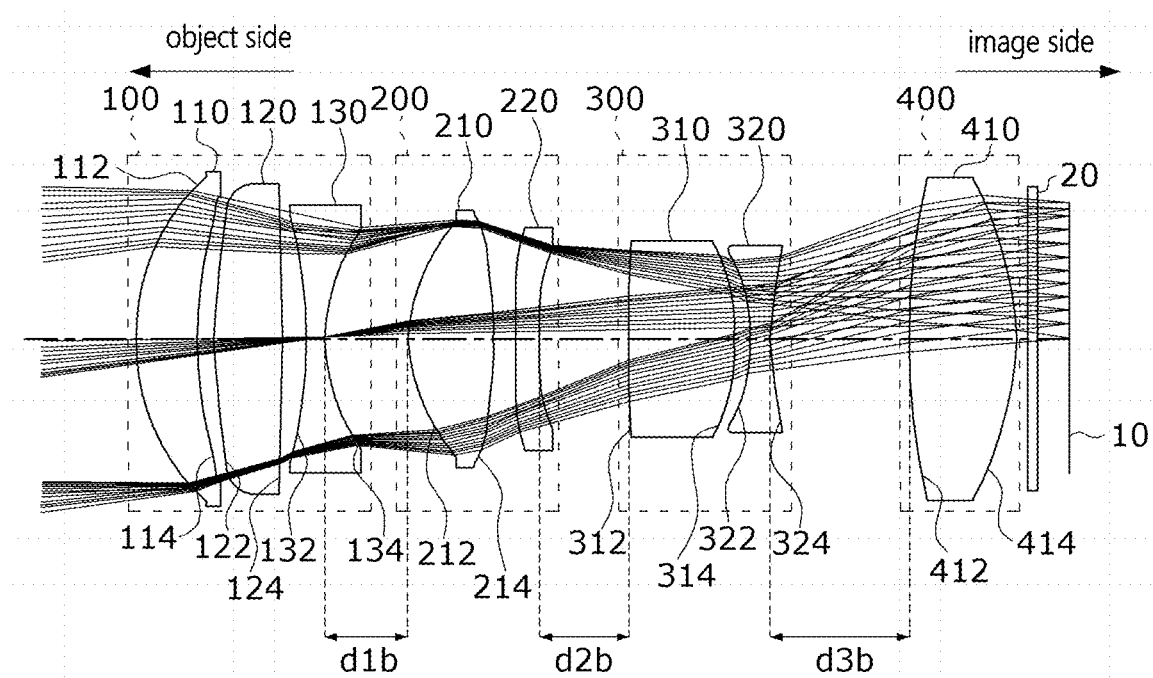

[FIG. 4C]
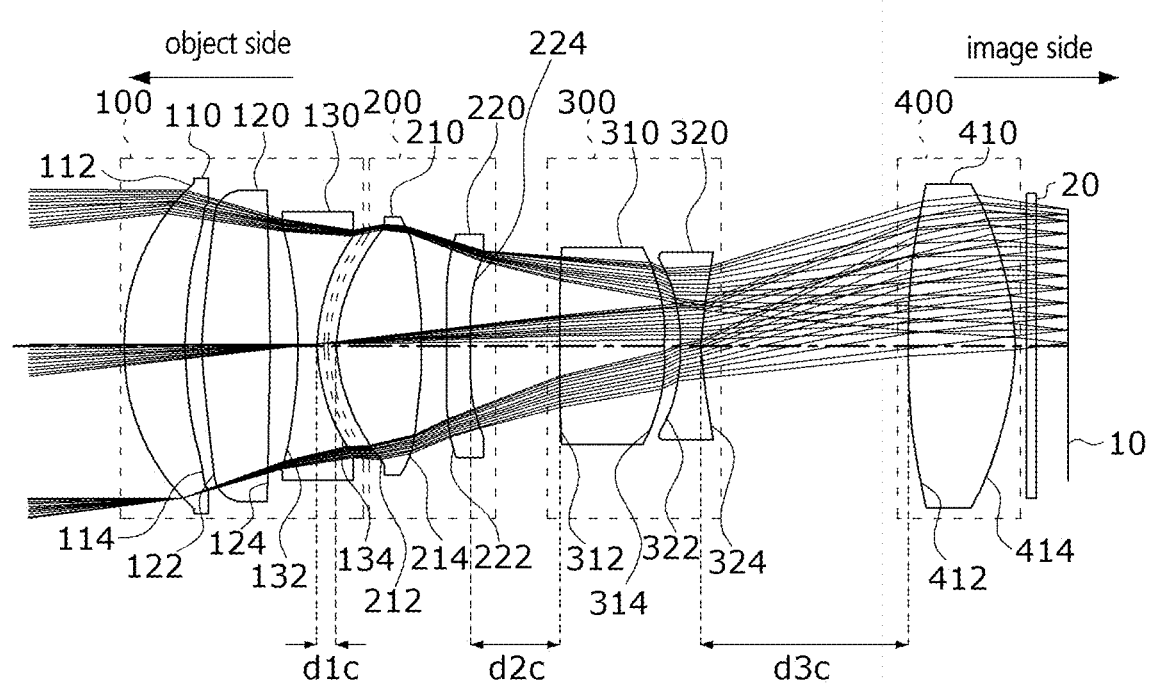

[FIG. 5A]
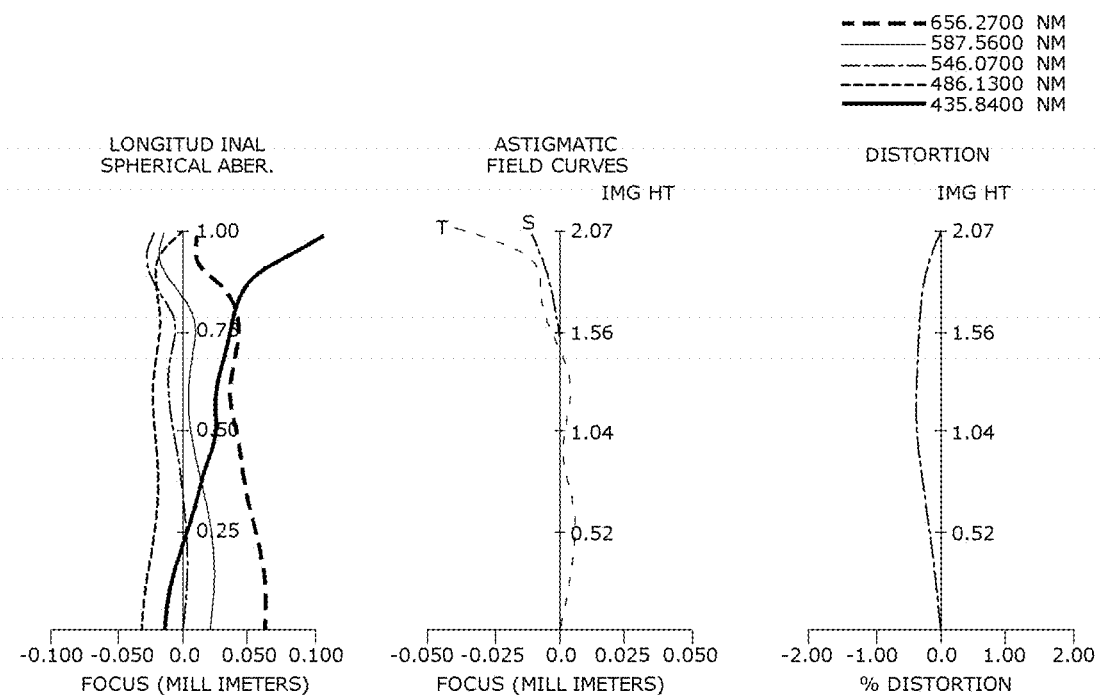

[FIG. 5B]
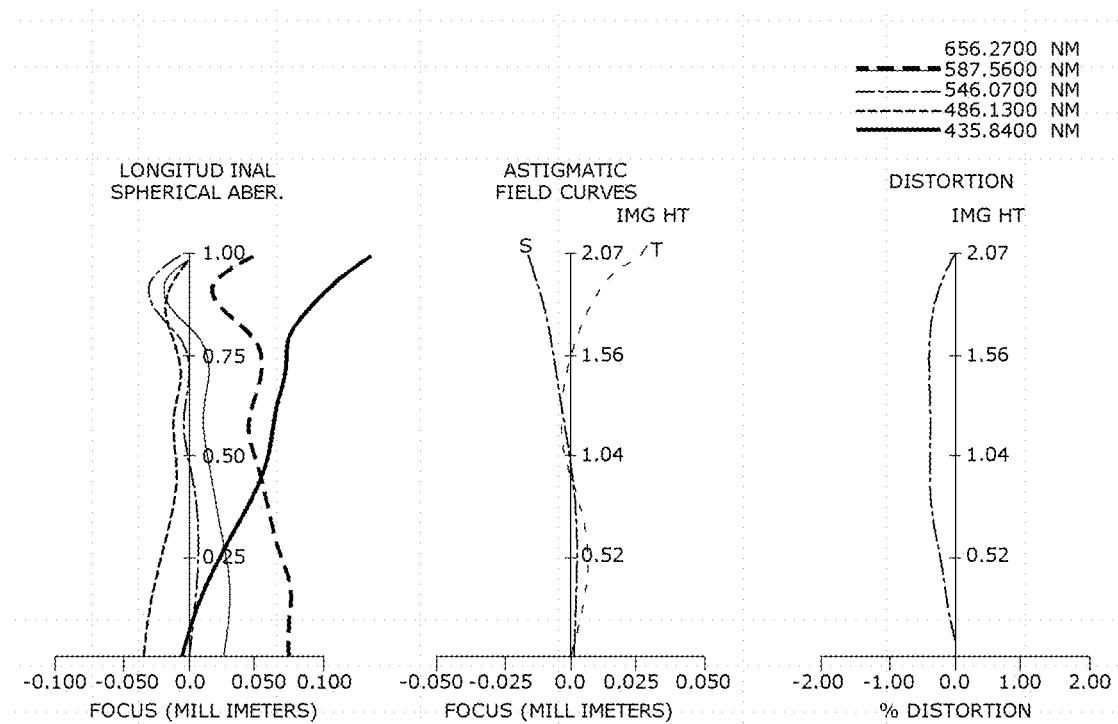

[FIG. 5C]
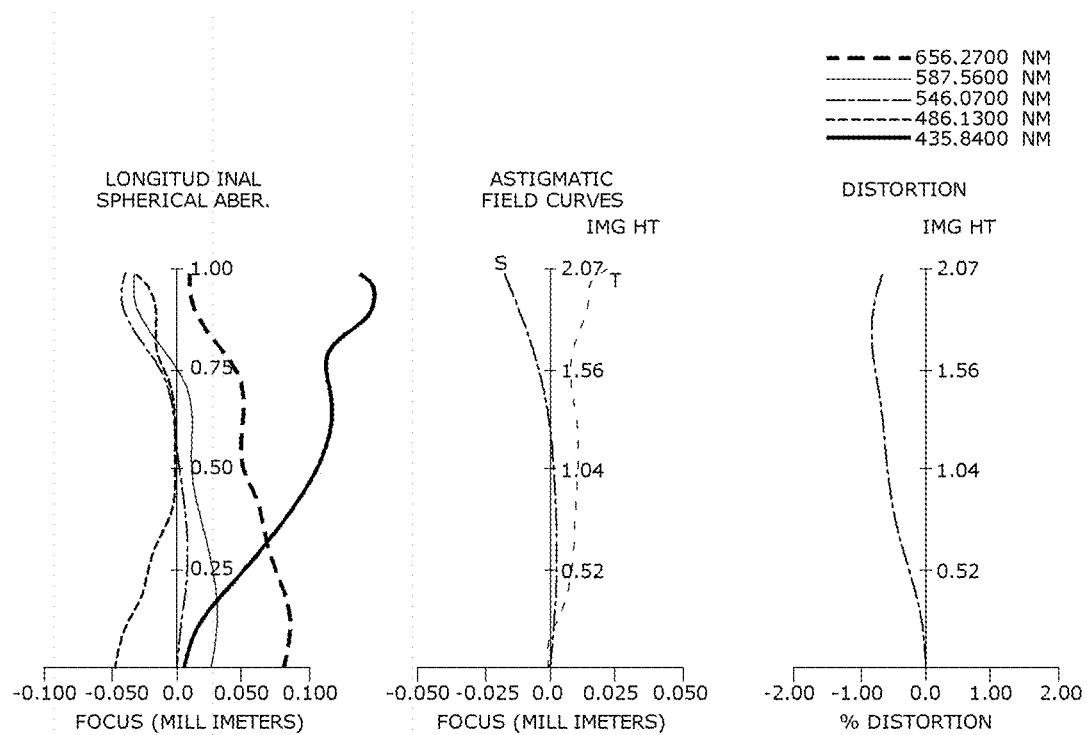

[FIG. 6A]
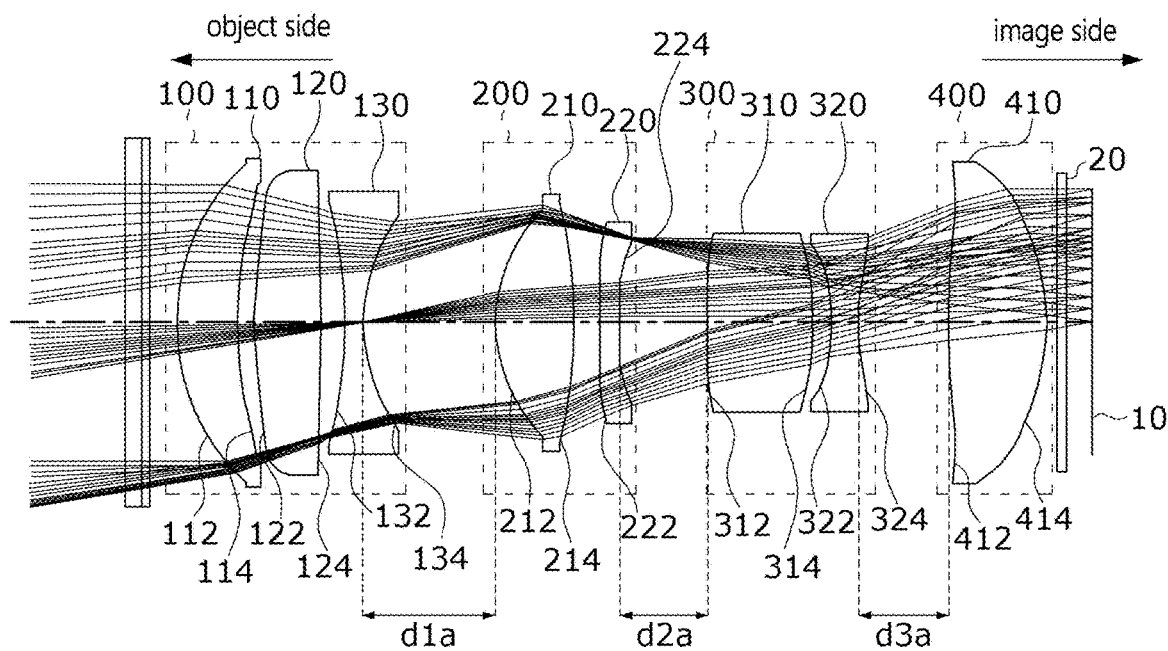

[FIG. 6B]
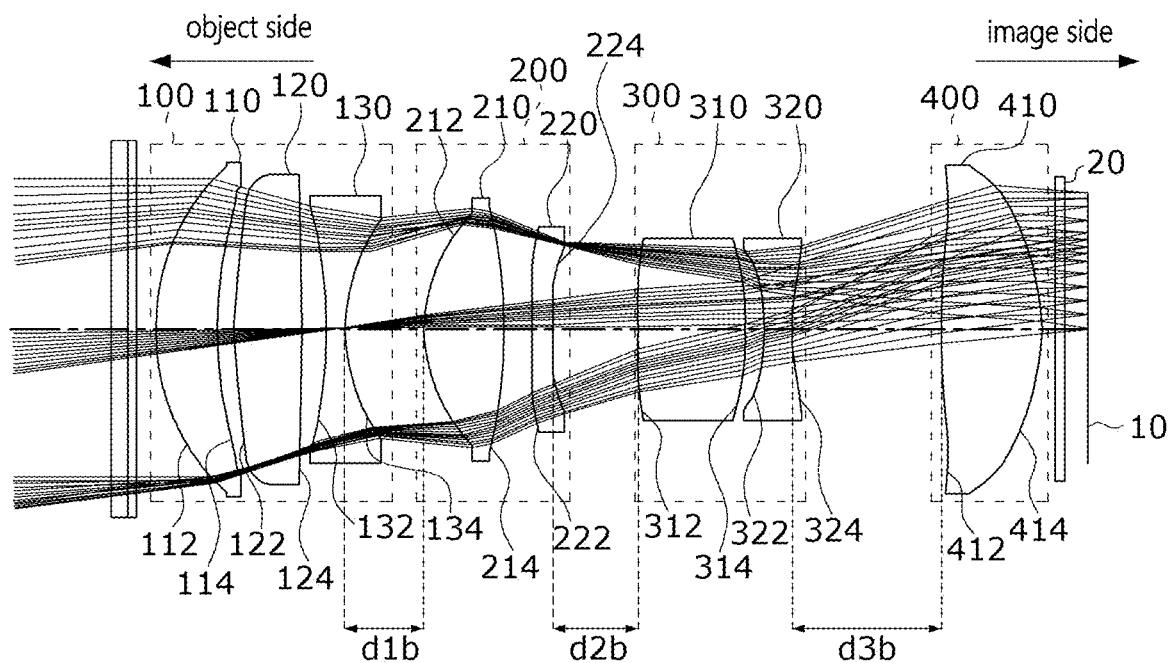

[FIG. 6C]
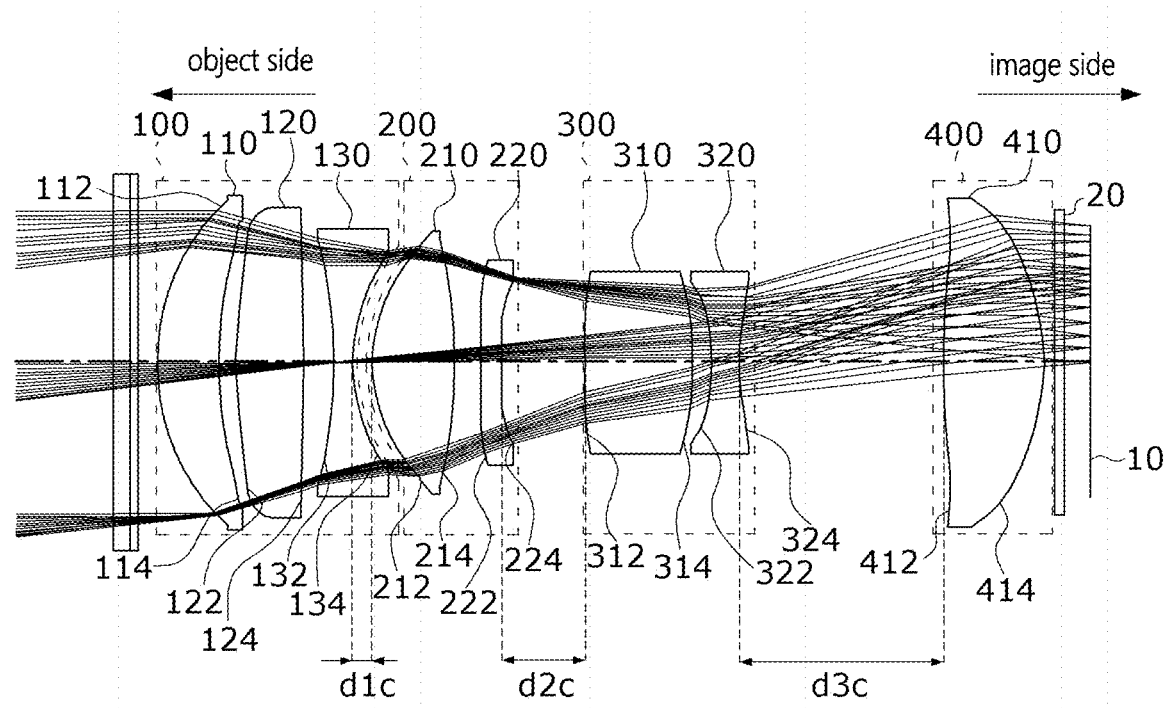

[FIG. 7A]
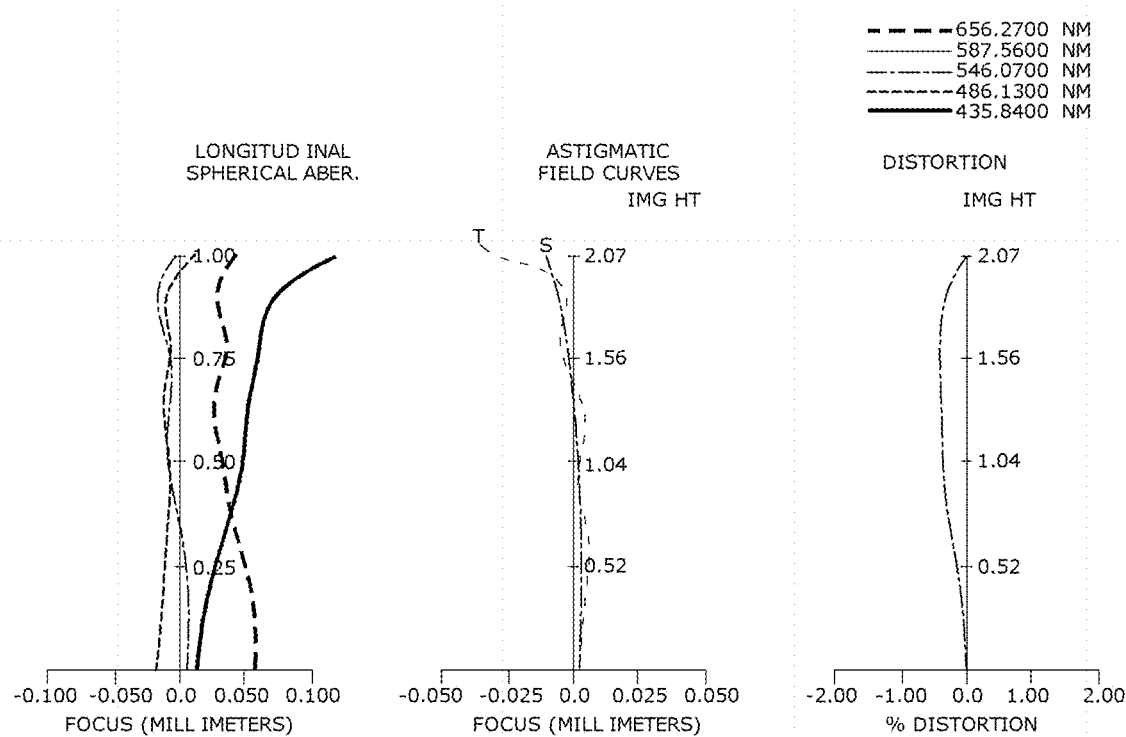

[FIG. 7B]
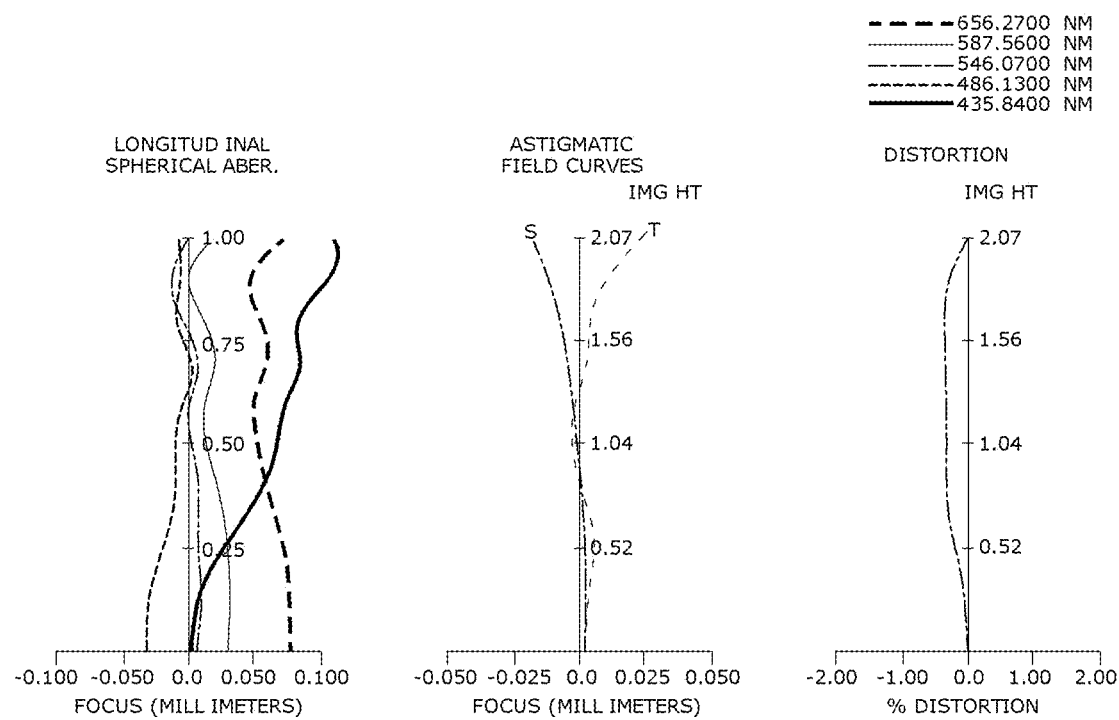

[FIG. 7C]
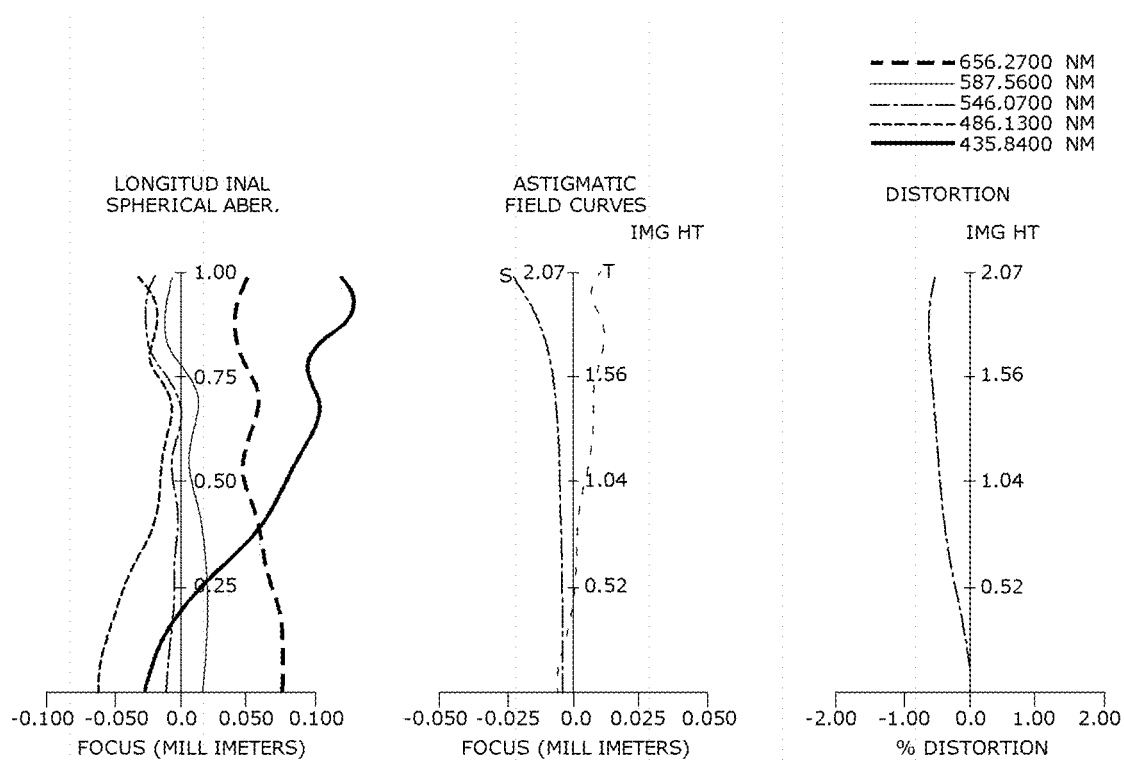

[FIG. 8]
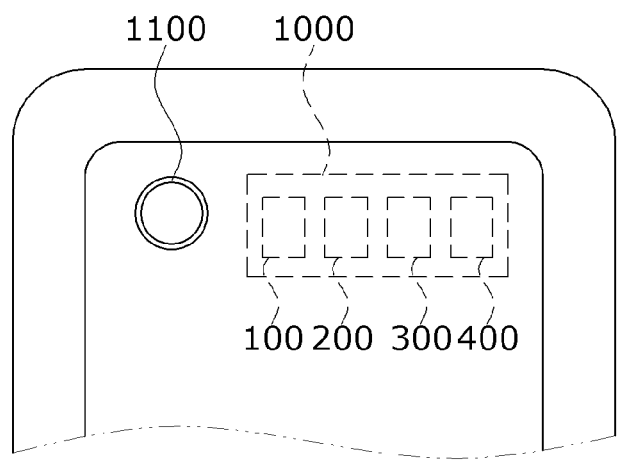

[FIG. 9]
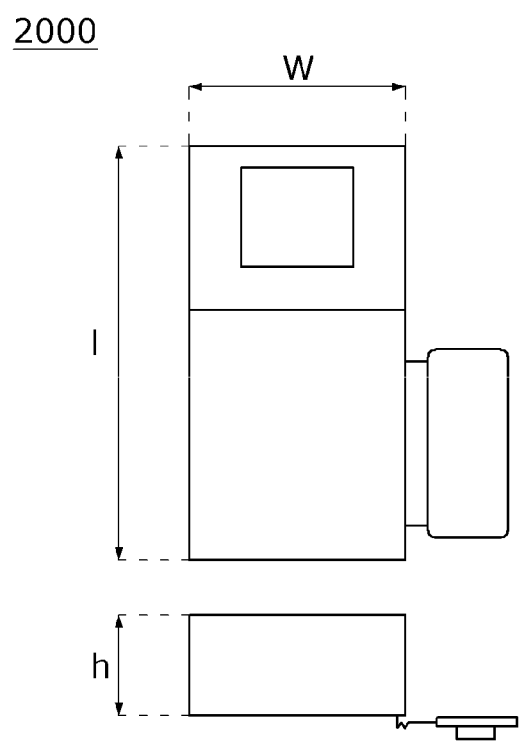

OPTICAL SYSTEM AND CAMERA MODULE COMPRISING SAME

CROSS REFERENCE TO RELATED APPLICATIONS

This application is the National Phase of PCT/KR2020/015770 filed on Nov. 11, 2020, which claims priority under 35 U.S.C. § 119 (a) to Patent Application Nos. 10-2019-0147738 and 10-2020-0144510 filed in the Republic of Korea on Nov. 18, 2019 and Nov. 2, 2020, all of which are hereby expressly incorporated by reference into the present application.

TECHNICAL FIELD

The present invention relates to an optical system and a camera module including the same.

BACKGROUND ART

As the performance of a camera module embedded in a portable terminal is developed, an auto-focusing function is also required for the camera module in the portable terminal.

In a process in which external light is converted into a digital image or digital video in order for the camera module in the portable terminal to have the auto-focusing function, a magnification may be increased through a digital process. Accordingly, it is possible to zoom only with a predetermined magnification such as 1 time, 3 times, and 5 times, and as the magnification is increased, there is a problem in that digital degradation occurs.

Meanwhile, in order for the camera module in the portable terminal to have the auto-focusing function, a technology of moving a lens to adjust a distance between the lens and an image sensor is being attempted. However, it is not easy to design an optical system capable of moving in a small space in the portable terminal.

DISCLOSURE

Technical Problem

The present invention is directed to providing a zoom optical system and a camera module including the same.

Objectives to be solved by the present invention are not limited to the above-described objectives, and include purposes or effects which may be understood from solutions or embodiments described below.

Technical Solution

One aspect of the present invention provides a zoom optical system including a first lens group, a second lens group, a third lens group, and a fourth lens group which are sequentially disposed in a direction from an object side to an image side, wherein the second lens group and the third lens group are movable, a total track length (TTL) is less than 20 mm, an effective focal length (EFL) in a telephoto is greater than 25 mm.

The EFL in the telephoto may be greater than 1.5 times an EFL in a wide-angle.

A movement stroke of the second lens group may be less than 2.5 mm during zooming from the wide-angle to the telephoto.

The second lens group and the third lens group may include at least one glass lens.

The glass lens may have a refractive index greater than 1.7, or an Abbe number greater than 60.

Lenses included in the first lens group to fourth lens group may be D-cut lenses. The second lens group and the third lens group may include the lens in which a value obtained by dividing a length of a long axis of an effective diameter by a length of a short axis of the effective diameter length is one.

A chief ray angle (CRA) may be less than 6°.

The zoom optical system may further include a right-angled prism sequentially disposed in front of the first lens group in the direction from the object side to the image side.

A value obtained by dividing the EFL by an f-number may be greater than 6 in the telephoto.

In the telephoto, the EFL may be greater than 25 mm, and an f-number may be less than 4.2.

Another aspect of the present invention provides a zoom optical system including a first lens group, a second lens group, a third lens group, and a fourth lens group which are sequentially disposed in a direction from an object side to an image side, wherein the second lens group and the third lens group are movable, and in a telephoto, an EFL is greater than 25 mm, and an f-number is less than 4.2.

Still another aspect of the present invention provides a zoom optical system including a first lens group, a second lens group, a third lens group, and a fourth lens group which are sequentially disposed in a direction from an object side to an image side, wherein the second lens group and the third lens group are movable, and a value obtained by dividing an EFL by an f-number is greater than 6 in a telephoto.

Advantageous Effects

According to embodiments, an optical system capable of zooming with a high magnification in addition to a low magnification and a camera module including the same can be obtained. In the optical system according to an embodiment of the present invention, zooming can be continuously adjusted, a high resolution can be maintained even with a high magnification, an f-number can be maintained even with a long focal length, a low chief ray angle (CRA) can be maintained, and thus the optical system with a compact size can be designed.

DESCRIPTION OF DRAWINGS

FIG. 1 is a view illustrating a zoom optical system according to an embodiment of the present invention.

FIG. 2A is a cross-sectional view illustrating a zoom optical system in a wide-angle according to a first embodiment of the present invention.

FIG. 2B is a cross-sectional view illustrating the zoom optical system in a middle mode according to the first embodiment of the present invention.

FIG. 2C is a cross-sectional view illustrating the zoom optical system in a telephoto according to the first embodiment of the present invention.

FIG. 3A is a graph showing longitudinal spherical aberrations, astigmatic field curves, and a distortion in the optical system in the wide-angle for light of wavelengths of 435 nm, 486 nm, 546 nm, 587 nm, and 656 nm according to the first embodiment.

FIG. 3B is a graph showing the longitudinal spherical aberrations, the astigmatic field curves, and the distortion in the optical system in the middle mode for the light of wavelengths of 435 nm, 486 nm, 546 nm, 587 nm, and 656 nm according to the first embodiment.

FIG. 3C is a graph showing the longitudinal spherical aberrations, the astigmatic field curves, and the distortion in the optical system in the telephoto for the light of wavelengths of 435 nm, 486 nm, 546 nm, 587 nm, and 656 nm according to the first embodiment.

FIG. 4A is a cross-sectional view illustrating a zoom optical system in a wide-angle according to a second embodiment of the present invention.

FIG. 4B is a cross-sectional view illustrating the zoom optical system in a middle mode according to the second embodiment of the present invention.

FIG. 4C is a cross-sectional view illustrating the zoom optical system in a telephoto according to the second embodiment of the present invention.

FIG. 5A is a graph showing longitudinal spherical aberrations, astigmatic field curves, and a distortion in the optical system in the wide-angle for light of wavelengths of 435 nm, 486 nm, 546 nm, 587 nm, and 656 nm according to the second embodiment.

FIG. 5B is a graph showing longitudinal spherical aberrations, astigmatic field curves, and a distortion in the optical system in the middle mode for light of wavelengths of 435 nm, 486 nm, 546 nm, 587 nm, and 656 nm according to the second embodiment.

FIG. 5C is a graph showing longitudinal spherical aberrations, astigmatic field curves, and a distortion in the optical system in the telephoto for light of wavelengths of 435 nm, 486 nm, 546 nm, 587 nm, and 656 nm according to the second embodiment.

FIG. 6A is a cross-sectional view illustrating a zoom optical system in a wide-angle according to a third embodiment of the present invention.

FIG. 6B is a cross-sectional view illustrating the zoom optical system in a middle mode according to the third embodiment of the present invention.

FIG. 6C is a cross-sectional view illustrating the zoom optical system in a telephoto according to the third embodiment of the present invention.

FIG. 7A is a graph showing longitudinal spherical aberrations, astigmatic field curves, and a distortion in the optical system in the wide-angle for light of wavelengths of 435 nm, 486 nm, 546 nm, 587 nm, and 656 nm according to the third embodiment.

FIG. 7B is a graph showing longitudinal spherical aberrations, astigmatic field curves, and a distortion in the optical system in the middle mode for light of wavelengths of 435 nm, 486 nm, 546 nm, 587 nm, and 656 nm according to the third embodiment.

FIG. 7C is a graph showing longitudinal spherical aberrations, astigmatic field curves, and a distortion in the optical system in the telephoto for light of wavelengths of 435 nm, 486 nm, 546 nm, 587 nm, and 656 nm according to the third embodiment.

FIG. 8 is a view illustrating a portion of a portable terminal to which a camera module according to one embodiment of the present invention is applied.

FIG. 9 is a view illustrating the camera module including the zoom optical system according to the embodiment of the present invention.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted in consideration of contextual meanings of the related technology.

In addition, the terms used in the embodiments of the present invention are considered in a descriptive sense and not to limit the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In descriptions of components of the present invention, terms such as "first," "second," "A," "B," "(a)," and "(b)" can be used.

The terms are only to distinguish one element from another element, and an essence, order, and the like of the element are not limited by the terms.

It should be understood that, when an element is referred to as being "connected or coupled" to another element, such a description may include both a case in which the element is directly connected or coupled to another element, and a case in which the element is connected or coupled to another element by still another element disposed therebetween.

In a case in which any one element is described as being formed or disposed "on or under" another element, such a description includes both a case in which the two elements are formed or disposed to be in direct contact with each other and a case in which one or more other elements are interposed between the two elements. In addition, when one element is described as being formed "on or under" another element, such a description may include a case in which the one element is formed at an upper side or a lower side with respect to another element.

FIG. 1 is a view illustrating a zoom optical system according to an embodiment of the present invention.

Referring to FIG. 1, the zoom optical system according to the embodiment of the present invention includes a first lens group 100, a second lens group 200, a third lens group 300, and a fourth lens group 400 which are sequentially disposed in a direction from an object side to an image side.

According to the embodiment of the present invention, the first lens group 100 includes a plurality of lenses and is fixed. That is, a plurality of lens 110, 120, and 130 are fixed. In this case, the first lens group 100 may include at least three lenses 110, 120, and 130. In a case in which the first lens group 100 includes two or less lenses, it may be difficult to correct a resolution at a maximum magnification, and in a case in which the first lens group 100 includes four or more lenses, since an overall size of the zoom optical system may be increased, the first lens group 100 may preferably include three lenses.

The second lens group 200 includes a maximum of two lenses 210 and 220 and is movable. That is, two lenses 210 and 220 are movable together along central axes of the lenses. As the second lens group 200 moves, a focal length may be sequentially adjusted. As the second lens group 200 moves, a magnification may be sequentially adjusted. Accordingly, the second lens group 200 may serve as a zooming group.

The third lens group 300 includes a maximum of two lenses 310 and 320 and is movable. That is, two lenses 310 and 320 are movable together along central axes of the lenses. As the third lens group 300 moves, a focus thereof may be adjusted. In addition, the third lens group 300 may serve as a focusing group.

In a case in which the second lens group 200 includes three or more lenses or the third lens group 300 includes three or more lenses, a size and a weight of the second lens group 200 or the third lens group 300 are increased, and driving power may be increased when the second lens group 200 or the third lens group 300 moves.

According to movement of the second lens group 200 and the third lens group 300, a magnification of the zoom optical system may increase or decrease continuously, for example, in the range of 5 times to 7.5 times. In this case, the continuous increase or decrease in the magnification does not refer to an intermittent increase or decrease in the magnification in a digital manner but may refer to a linear decrease or decrease therein.

Each of the second lens group 200 and the third lens group 300 may move independently. For example, when a wide-angle is changed to a telephoto, a distance between the second lens group 200 and the third lens group 300 may increase in a direction from a movement start point (wide-angle start point) to a predetermined point and decrease in a direction from the predetermined point to a movement end point (telephoto end point).

The fourth lens group 400 includes one lens 410, and one lens 410 is fixed.

According to the embodiment of the present invention, a filter 20 and an image sensor 10 may be sequentially disposed behind the third lens group 300. In this case, the filter 20 may be an infrared (IR) filter. Accordingly, the filter 20 may block near IR light, for example, light of a wavelength of 700 nm to 1100 nm from light incident on the camera module. In addition, the image sensor 10 may be connected to a printed circuit board through wires.

Alternatively, the filter 20 may also include a foreign material blocking filter and an IR filter sequentially disposed in the direction from the object side to the image side. In a case in which the filter 20 includes the foreign material blocking filter, foreign materials generated while the third lens group 300 is moving may be prevented from being introduced to the IR filter or the image sensor 10.

According to the embodiment of the present invention, in the zoom optical system, a total track length (TTL) may be less than 20 mm. Here, the TTL may refer to a length from a surface of the image sensor to a first surface of the zoom optical system. For example, the TTL may refer to a length from one surface, which is closest to the object side, of the first lens group 100 to an upper surface of the image sensor 10 on which light is incident. In this specification, the TTL is interchangeable with a total length.

According to the embodiment of the present invention, in the zoom optical system, an effective focal length (EFL, f) in the telephoto may be greater than 25 mm. The EFL of the zoom optical system in the wide-angle may be less than 17.5 mm. In the zoom optical system, the EFL in the telephoto may be greater than 1.5 times the EFL in the wide-angle.

According to the embodiment of the present invention, in the zoom optical system, an f-number (Fno) in the telephoto may be less than 4.2. In this case, the f-number may refer to a ratio (f/D) of the focal length (f) to an effective diameter (D) of an aperture. As the f-number decreases, an amount of collected light increases so that an image may be brightened, and as the f-number increases, an amount collected light decreases so that an image may be darkened. Accordingly, in the zoom optical system according to the embodiment of the present invention, since the f-number is less than 4.2 even at a long distance in which the EFL in the telephoto is greater than 25 mm, a predetermined brightness may be maintained.

According to the embodiment of the present invention, in the zoom optical system, the ratio (f/Fno) of the focal length to the f-number at the maximum magnification may be greater than 6. That is, since the f-number is smaller than the focal length, the predetermined brightness may be maintained even with the high magnification.

According to the embodiment of the present invention, a movement stroke of the second lens group 200 may be less than 2.5 mm. In this case, the movement stroke may refer to a distance in which the lens group is movable by a driving part. Accordingly, the second lens group 200 may move in units less than 2.5 mm when a mode thereof is changed from the telephoto to the wide-angle (from the wide-angle to the telephoto). In a case in which the movement stroke is greater than 2.5 mm or more, since a size of the driving part for moving the lens groups increases excessively, there is a problem in that it is difficult to install the camera module in a portable terminal. However, since the movement stroke is implemented to be less than 2.5 mm, the camera module may be miniaturized.

According to the embodiment of the present invention, in at least one of the lenses 210, 220, 310, and 320 included in the second lens group 200 and the third lens group 300, a refractive index may be greater than 1.7, or an Abbe number may be greater than 60. That is, in at least one of the plurality of lenses 210 and 220 included in the second lens group 200, the refractive index may be greater than 1.7 or the Abbe number may be greater than 60, and in at least one of the plurality of lenses 310 and 320 included in the third lens group 300, the refractive index may be greater than 1.7 or the Abbe number may be greater than 60. At least one of the plurality of lens 210, 220, 310, and 320 included in the second lens group 200 and third lens group 300 may be a glass lens. The lens whose refractive index is greater than 1.7 or Abbe number is greater than 60 may be the glass lens. According to the embodiment of the present invention, by using the glass lens, a volume of the zoom optical system may be decreased, and accordingly, a movable distance of the second lens group 200 and the third lens group 300, that is, the number of strokes, may be decreased. In addition, by using the glass lens, a chromatic aberration may be reduced, and the refractive index may be increased so that the performance may be improved.

According to the embodiment of the present invention, the plurality of lenses 110, 120, 130, 210, 220, 310, 320, and 410 included in the first to fourth lens groups 100 to 400 may be lenses to which a D-cut technology is applied. Each of the plurality of lenses 110, 120, 130, 210, 220, 310, 320, and 410 included in the first to fourth lens groups 100 to 400 may be a D-cut lens in which a portion of an upper side portion and a portion of a lower side portion are cut. In this case, ribs and the portions of the upper side portion and the lower side portion in an effective diameter of each of the plurality of lenses 110, 120, 130, 210, 220, 310, 320, and 410 may be cut, or only the ribs thereof may be cut without cutting the effective diameter. According to one embodiment, the second lens group 200 and the third lens group may include the lens in which a value obtained by dividing a length of a long axis of the effective diameter by a length of a short axis of the effective diameter is 1. That is, the length of the long axis of the effective diameter and the length of the short axis of the effective diameter may be the same. For example, in the case of the fifth lens 220, the sixth lens 310, and the seventh lens 320, the only ribs of the upper side portions and lower side portions may be cut and the effective diameters may not be cut. In the circular type lenses, there is a problem in that a volume increases due to a vertical height, but since the D-cut technology is applied to the upper side portion and the lower side portion of each of the plurality of lenses 110, 120, 130, 210, 220, 310, 320, and 410, the vertical height may be decreased so that the volume of the lens may be decreased.

A magnification may be changed according to a distance between the first lens group 100 and the second lens group 200, a distance between the second lens group 200 and the third lens group 300, and a distance between the third lens group 300 and the fourth lens group 400.

According to the embodiment of the present invention, in the zoom optical system, a chief ray angle (CRA) may be less than 6. Accordingly, since an angle of light incident on the image sensor 10 is small, a degree of sensor selection freedom may be improved, and a more compact size zoom optical system may be obtained.

Hereinafter, the present invention will be described with reference to various embodiments.

FIG. 2A is a cross-sectional view illustrating a zoom optical system in a wide-angle according to a first embodiment of the present invention, FIG. 2B is a cross-sectional view illustrating the zoom optical system in a middle mode according to the first embodiment of the present invention, and FIG. 2C is a cross-sectional view illustrating the zoom optical system in a telephoto according to the first embodiment of the present invention.

Tables 1 and 2 below show optical properties of lenses included in the zoom optical system according to the first embodiment of the present invention, and Tables 3 and 4 show Koenig constants and aspheric coefficients of the lenses included in the zoom optical system according to the first embodiment of the present invention.

TABLE 1

| Lens No. | Lens Surface No. | Radius of Curvature (R, mm) | Thickness (mm) | Material | Refractive Index | Abbe Number |
|---|---|---|---|---|---|---|
| First Lens | 112 | 5.09332 | 1.321 | Plastic | 1.543 | 56 |
| | 114 | 8.20973 | 0.354 | | | |
| Second Lens | 122 | 7.38868 | 1.467 | Plastic | 1.534 | 55.7 |
| | 124 | 42.86606 | 0.522 | | | |
| Third Lens | 132 | −571.0256 | 0.4 | Plastic | 1.543 | 56 |
| | 134 | 2.75164 | 2.877 (0.4) | | | |
| Fourth Lens | 212 | 3.1161 | 2.129 | Glass | 1.497 | 81.5 |
| | 214 | −7.60372 | 0.421 | | | |
| Fifth Lens | 222 | −41.06875 | 0.4 | Plastic | 1.671 | 19.4 |
| | 224 | 11.86708 | 1.368 (1.344) | | | |

TABLE 1-continued

| Lens No. | Lens Surface No. | Radius of Curvature (R, mm) | Thickness (mm) | Material | Refractive Index | Abbe Number |
|---|---|---|---|---|---|---|
| Sixth Lens | 312 | 38.74097 | 2.314 | Plastic | 1.671 | 19.4 |
| | 314 | −6.13888 | 0.431 | | | |
| Seventh Lens | 322 | −7.8 | 0.4 | Glass | 1.772 | 49.5 |
| | 324 | 3.17681 | 2.83 (5.332) | | | |
| Eighth Lens | 412 | 19.24552 | 1.76 | Plastic | 1.543 | 56 |
| | 414 | −5.52103 | 0.1 | | | |
| Filter | | | 0.21 | Glass | | |
| Sensor | | | 0.689 | | | |

TABLE 2

| Lens No. | Lens Surface No. | Focal Length | Shape | Refractive Power | Long Axis Effective Diameter | Short Axis Effective Diameter |
|---|---|---|---|---|---|---|
| First Lens | 112 | 21.34 | Convex | + | 6.538 | 5.1 |
| | 114 | | Concave | | | |
| Second Lens | 122 | 16.38 | Convex | + | 6.114 | 5.1 |
| | 124 | | Convex | | | |
| Third Lens | 132 | −5 | Concave | − | 5.23 | 5.1 |
| | 134 | | Concave | | | |
| Fourth Lens | 212 | 4.74 | Convex | + | 5.19 | 4.2 |
| | 214 | | Convex | | | |
| Fifth Lens | 222 | −13.5 | Convex | − | 4.05 | 4.05 |
| | 224 | | Concave | | | |
| Sixth Lens | 312 | 7.96 | Convex | + | 3.59 | 3.59 |
| | 314 | | Convex | | | |
| Seventh Lens | 322 | −2.86 | Concave | − | 3.59 | 3.59 |
| | 324 | | Concave | | | |
| Eighth Lens | 412 | 8.04 | Convex | + | 6.26 | 5 |
| | 414 | | Convex | | | |
| Filter | | | | | | |
| Sensor | | | | | | |

Here, a thickness (mm) denotes a distance from a lens surface to the next lens surface. For example, a thickness written to correspond to an object side surface 112 of a first lens 110 denotes a distance from the object side surface 112 of the first lens 110 to an image side surface 114. In addition, a thickness written to correspond to the image side surface 114 of the first lens 110 denotes a distance from the image side surface 114 of the first lens 110 to an object side surface 122 of a second lens 120. Meanwhile, a thickness written to correspond to an image side surface 134 of a third lens 130 denotes a distance from the image side surface 134 of the third lens 130 to an object side surface 212 of a fourth lens 210. In this case, the fourth lens 210 is a lens included in a second lens group 200 and is moved in a process of zooming from a wide-angle to a telephoto, and thus the thickness written to correspond to the image side surface 134 of the third lens 130 may have a value ranging from the shortest distance of 2.877 to the longest distance of 0.4. Then, a thickness written to correspond to an image side surface 134 of a fifth lens 130 and a thickness written to correspond to an image side surface 134 of a seventh lens 130 are the same as the thickness written to correspond to the image side surface 134 of the third lens 130.

TABLE 3

| Lens Surface No. | Koenig Constant (K) | A | B | C | D |
|---|---|---|---|---|---|
| 112 | 0.04793 | 0.584734E−03. | −.63583E−04 | 0.374447E−04 | 0469101E−05 |
| 114 | −23.7997 | 0.286149E−02 | −.151722E−02 | 0.133901E−02 | −.614006E−03 |
| 122 | −21.7583 | 0.230829E−03 | −.168409E−02 | 0.157993E−02 | −.776442E−03 |
| 124 | 231.1465 | −.366875E−03 | −.104159E−02 | 0.582199E−03 | −.363747E−03 |
| 132 | 34.89143 | −.872861E−02 | 0.308842E−03 | −.604317E−04 | −.615764E−04 |

TABLE 3-continued

| Lens Surface No. | Koenig Constant (K) | A | B | C | D |
|---|---|---|---|---|---|
| 134 | −3.50824 | 0.102681E−02 | −.332124E−03 | −.221101E−03 | 0.274225E−03 |
| 212 | −0.18938 | −.822250E−03 | −.496259E−04 | 0.192442E−04 | −.160093E−04 |
| 214 | −19.1275 | −.242835E−03 | −.337298E−04 | 0.669723E−05 | −.473627E−05 |
| 222 | −300 | 0.431332E−02 | 0.104552E−02 | 0.822305E−03 | −.797199E−03 |
| 224 | 33.89123 | 0.443477E−02 | 0.203439E−02 | 0.139139E−03 | −.243649E−03 |
| 312 | 87.23992 | 0.380665E−02 | −.903803E−03 | 0.410822E−03 | −.120880E−03 |
| 314 | −31.7457 | −.273415E−04 | −.365800E−02 | 0.980293E−03 | −.129198E−03 |
| 322 | 6.93915 | −.486506E−01 | 0.131593E−01 | −.392807E−02 | 0.161783E−02 |
| 324 | −10.4414 | −.335202E−01 | 0.143163E−01 | −.409120E−02 | 0.901720E−03 |
| 412 | 33.74344 | −.136863E−02 | 0.430432E−03 | −.259953E−03 | 0.626468E−04 |
| 414 | −0.55355 | −.493293E−02 | 0.180867E−02 | −.450166E−03 | 0.661797E−04 |

TABLE 4

| Lens Surface No. | E | F | G | H | J |
|---|---|---|---|---|---|
| 112 | −.714424E−05 | 0.202669E−05 | −.266184E−06 | 0.169381E−07 | −.420410E−09 |
| 114 | 0.158206E−03 | −.240153E−04 | 0.209289E−05 | −.951630E−07 | 0.172294E−08 |
| 122 | 0.220341E−03 | −.380107E−04 | 0.389013E−05 | −.215106E−06 | 0.493703E−08 |
| 124 | 0.126525E−03 | −.262320E−04 | 0.335950E−05 | −.244027E−06 | 0.757052E−08 |
| 132 | 0.483200E−04 | −.126349E−04 | 0.173156E−05 | −.133917E−06 | 0.473017E−08 |
| 134 | −.115586E−03 | 0.303244E−04 | −.508742E−05 | 0.477982E−06 | −.186737E−07 |
| 212 | 0.586736E−05 | −.126394E−05 | 0.160019E−06 | −.123770E−07 | 0.407360E−09 |
| 214 | 0.180960E−03 | −.425294E−04 | 0.597632E−05 | −.459342E−06 | 0.148742E−07 |
| 222 | 0.349722E−03 | −.938080E−04 | 0.145045E−04 | −.112921E−05 | 0.338441E−07 |
| 224 | 0.106547E−03 | −.298249E−04 | 0.386278E−05 | −.692719E−07 | −.163654E−07 |
| 312 | 0.182476E−04 | −.134488E−05 | 0.110107E−06 | 0.121647E−07 | −.611321E−09 |
| 314 | 0.900381E−05 | −.107659E−05 | −.423120E−07 | 0.912264E−07 | −.383290E−10 |
| 322 | −.514013E−03 | 0.105682E−03 | −.159152E−04 | 0.108879E−05 | 0.147724E−06 |
| 324 | −.146622E−03 | 0.201824E−04 | −.326987E−05 | 0.696604E−07 | 0.730964E−07 |
| 412 | −.828509E−05 | 0.581489E−06 | −.227366E−07 | 0.388369E−09 | 0.281021E−11 |
| 414 | −.531016E−05 | 0.182075E−06 | −.342486E−09 | −.251764E−09 | 0.143908E−10 |

Referring to FIGS. 2A to 2C and Tables 1 to 4, a zoom optical system includes a first lens group 100, a second lens group 200, a third lens group 300, and a fourth lens group 400 which are sequentially disposed in a direction from an object side to an image side. The first lens group 100 includes the first lens 110, the second lens 120, and the third lens 130 which are sequentially disposed in the direction from the object side to the image side, the second lens group 200 includes the fourth lens 210 and the fifth lens 220 which are sequentially disposed in the direction from the object side to the image side, the third lens group 300 includes a sixth lens 310 and the seventh lens 320 which are sequentially disposed in the direction from the object side to the image side, and the fourth lens group 400 includes an eighth lens 410. In this case, the first lens 110 may include the convex object side surface 112 and the concave image side surface 114, the second lens 120 may include the convex object side surface 122 and a convex image side surface 124, and the third lens 130 may include a concave object side surface 132 and the concave image side surface 134.

In addition, the fourth lens 210 may include the convex object side surface 212 and a convex image side surface 214, and the fifth lens 220 may include a convex object side surface 222 and the concave image side surface 224.

In addition, the sixth lens 310 may include a convex object side surface 312 and a convex image side surface 314, and the seventh lens 320 may include a concave object side surface 322 and the concave image side surface 324.

In addition, the eighth lens 410 may include a convex object side surface 412 and a convex image side surface 414.

The first lens 110 may have positive refractive power, the second lens 120 may have positive refractive power, and the third lens 130 may have negative refractive power. The fourth lens 210 may have positive refractive power and the fifth lens 220 may have negative refractive power. The sixth lens 310 may have positive refractive power, and the seventh lens 320 may have negative refractive power. The eighth lens 410 may have positive refractive power.

In addition, an Abbe number of the fourth lens 210 is 49.5 which is the highest Abbe number among those of the first lens 110 to the eighth lens 410. A focal length (f) of the seventh lens 320 is 1.772 mm which is the highest refractive index among those of the first lens 110 to the eighth lens 410. The fourth lens 210 and the seventh lens 320 may be glass lenses.

In each of the fifth lens 220, the sixth lens 310, and the seventh lens 320, a length of a long axis of an effective diameter is equal to a length of a short axis of the effective diameter. That is, when a D-cut technology is applied thereto, the effective diameter may not be cut. However, in each of the first lens 110 to the fourth lens 210 and the eighth lens 410, since a length of a long axis of an effective diameter is different from a length of a short axis of the effective diameter, a portion of an upper side portion and a portion of a lower side portion of the effective diameter may be cut.

In FIG. 2A, in a case in which a distance between the first lens group 100 and the second lens group 200 is d1a, a distance between the second lens group 200 and the third lens group 300 is d2a, and a distance between the third lens group 300 and the fourth lens group 400 is d3a, for example, a magnification may be 5 times in the wide-angle. In addition, when the second lens group 200 and the third lens group 300 are moved to be closer to the first lens group 100 as illustrated in FIGS. 2B and 2C, the distance between the first lens group 100 and the second lens group 200 may decrease to d1c, the distance between the second lens group 200 and the third lens group 300 may decrease to d2c, and the distance between the third lens group 300 and the fourth lens group 400 may decrease to d3c so that, for example, the magnification may be 7.5 times in the telephoto. As described above, as the second lens group 200 and the third lens group 300 are moved, the magnification of the zoom optical system may be continuously adjusted from 5 times to 7.5 times.

Accordingly, in the wide-angle of FIG. 2A, it may be seen that an EFL of the zoom optical system according to the first embodiment is 17.44 and an f-number (Fno) thereof is 2.91, and in the telephoto of FIG. 2C, the EFL of the zoom optical system according to the first embodiment is 26.33 mm and the f-number (Fno) thereof is 4.02.

In this case, it may be seen that a movement amount of the third lens group 300 is greater than a movement amount of the second lens group 200. That is, a difference value between d1a and d1b may be less than a difference value between d2a and d2b, and a difference value between d1b and d1c may be less than a difference value between d2b and d2c.

FIG. 3A is a graph showing longitudinal spherical aberrations, astigmatic field curves, and a distortion in the optical system in the wide-angle for light of wavelengths of 435 nm, 486 nm, 546 nm, 587 nm, and 656 nm according to the first embodiment, FIG. 3B is a graph showing the longitudinal spherical aberrations, the astigmatic field curves, and the distortion in the optical system in the middle mode for the light of wavelengths of 435 nm, 486 nm, 546 nm, 587 nm, and 656 nm according to the first embodiment, and FIG. 3C is a graph showing the longitudinal spherical aberrations, the astigmatic field curves, and the distortion in the optical system in the telephoto for the light of wavelengths of 435 nm, 486 nm, 546 nm, 587 nm, and 656 nm according to the first embodiment.

The longitudinal spherical aberration refers to a longitudinal spherical aberration according to each wavelength, the astigmatic field curve refers to an aberration property of a tangential plane and a sagittal plane according to a height of an image surface, and the distortion refers to a distortion degree according to the height of the image surface. Referring to FIGS. 3A to 3C, it may be seen that the longitudinal spherical aberration ranges from −0.05 mm to 0.05 mm regardless of the wavelength, the astigmatic field curves ranges from −0.05 mm to 0.05 mm regardless of the wavelength, and the distortion ranges from −0.05 mm to 0.05 mm regardless of the wavelength.

FIG. 4A is a cross-sectional view illustrating a zoom optical system in a wide-angle according to a second embodiment of the present invention, FIG. 4B is a cross-sectional view illustrating the zoom optical system in a middle mode according to the second embodiment of the present invention, and FIG. 4C is a cross-sectional view illustrating the zoom optical system in a telephoto according to the second embodiment of the present invention.

Table 5 below shows optical properties of lenses included in the zoom optical system according to the second embodiment of the present invention, and Tables 6 and 7 show Koenig constants and aspheric coefficients of the lenses included in the zoom optical system according to the second embodiment of the present invention.

TABLE 5

| Lens No. | Lens Surface No. | Radius of Curvature (R, mm) | Thickness (mm) | Product Name |
|---|---|---|---|---|
| First Lens | 112 | 5.11125 | 1.282662 | APL5514 |
| | 114 | 8.33638 | 0.370672 | |
| Second Lens | 122 | 7.47906 | 1.457307 | K26R |
| | 124 | 43.37639 | 0.515582 | |
| Third Lens | 132 | 1512.8711 | 0.478292 | APL5514 |
| | 134 | 2.81101 | 0 | |
| Fourth Lens | 212 | 3.35541 | 1.82813 | MFCD1_HOYA |
| | 214 | −9.43322 | 0.490482 | |
| Fifth Lens | 222 | 668.5719 | 0.510467 | EP9000 |
| | 224 | 13.75396 | 1.969721 | |
| Sixth Lens | 312 | 85.04186 | 2.3 | 614000.3 |
| | 314 | −3.8384 | 0.327093 | |
| Seventh Lens | 322 | −7.274 | 0.400575 | MTAF307_HOYA |
| | 324 | 2.94882 | 1.835413 | |
| Eighth Lens | 412 | 17.77055 | 2.3 | EP5000 |
| | 422 | −6.48153 | 0.229179 | |

Here, a thickness (mm) denotes a distance from a lens surface to the next lens surface. For example, a thickness written to correspond to an object side surface 112 of a first lens 110 denotes a distance from the object side surface 112 of the first lens 110 to an image side surface 114. In addition, a thickness written to correspond to the image side surface 114 of the first lens 110 denotes a distance from the image side surface 114 of the first lens 110 to an object side surface 122 of a second lens 120.

TABLE 6

| lens surface No. | Koenig Constant K | A | B | C | D |
|---|---|---|---|---|---|
| 112 | 0.06245 | 0.660858E−03 | −.779886E−04 | 0.378640E−04 | 0.475249E−05 |
| 114 | −16.64022 | 0.289497E−02 | −.150193E−02 | 0.133995E−02 | −.614064E−03 |
| 122 | −16.11665 | 0.572658E−03 | −.169434E−02 | 0.157848E−02 | −.776453E−03 |
| 124 | 232.77852 | −.104901E−02 | −.967636E−03 | 0.587937E−03 | −.363684E−03 |
| 132 | −124.7928 | −.850850E−02 | 0.322980E−03 | −.538081E−04 | −.611000E−04 |
| 134 | −3.431694 | 0.168925E−02 | −.344890E−03 | −.229632E−03 | 0.274680E−03 |
| 212 | −0.18653 | −.798054E−03 | −.627415E−04 | 0.337313E−04 | −.171974E−04 |
| 214 | −18.0007 | −.317553E−03 | −.489482E−04 | 0.664770E−03 | −.475114E−03 |
| 222 | −239.363 | 0.324945E−02 | 0.990737E−03 | 0.800253E−03 | −.798726E−03 |
| 224 | 41.19744 | 0.403083E−02 | 0.153286E−02 | 0.147269E−03 | −.244862E−03 |
| 312 | −147.956 | 0.327345E−02 | −.535827E−03 | 0.277790E−03 | −.117922E−03 |
| 314 | −19.1218 | −.588982E−02 | −.222257E−02 | 0.802397E−03 | −.189050E−03 |
| 322 | 3.963647 | −.413099E−01 | 0.806205E−02 | −.152743E−02 | 0.103717E−02 |
| 324 | −11.2684 | −.262298E−01 | 0.102257E−01 | −.257929E−02 | 0.630119E−03 |

TABLE 6-continued

| lens surface No. | Koenig Constant K | A | B | C | D |
|---|---|---|---|---|---|
| 412 | 16.2485 | −.756701E−03 | 0.705849E−03 | −.296592E−03 | 0.625942E−04 |
| 414 | −5.41358 | −.576133E−02 | 0.202537E−02 | −.503766E−03 | 0.694023E−04 |

TABLE 7

| Lens Surface No. | E | F | G | H | J |
|---|---|---|---|---|---|
| 112 | −.714577E−05 | 0.202607E−05 | −.266233E−06 | 0.169382E−07 | −.419812E−09 |
| 114 | 0.158194E−03 | −.240164E−04 | 0.209284E−05 | −.951620E−07 | 0.172360E−08 |
| 122 | 0.220347E−03 | −.380104E−04 | 0.389011E−05 | −.215111E−06 | 0.493640E−08 |
| 124 | 0.126503E−03 | −.262349E−04 | 0.335928E−05 | −.244029E−06 | 0.757296E−08 |
| 132 | 0.482956E−04 | −.126445E−04 | 0.173027E−05 | −.133997E−06 | 0.474645E−08 |
| 134 | −.115433E−03 | 0.303173E−04 | −.509232E−05 | 0.477590E−06 | −.185611E−07 |
| 212 | 0.560841E−05 | −.127195E−05 | 0.161757E−06 | −.123025E−07 | 0.340076E−09 |
| 214 | 0.180709E−03 | −.425366E−04 | 0.598153E−05 | −.458474E−06 | 0.147142E−07 |
| 222 | 0.350408E−03 | −.936697E−04 | 0.144904E−04 | −.113471E−05 | 0.342975E−07 |
| 224 | 0.104050E−03 | −.299981E−04 | 0.406452E−05 | −.582440E−07 | −.176018E−07 |
| 312 | 0.181222E−04 | −.455233E−06 | −.694093E−09 | 0.210113E−08 | −.391643E−09 |
| 314 | 0.200123E−04 | 0.218769E−06 | 0.332082E−07 | −.680646E−09 | −.383005E−10 |
| 322 | −.471139E−03 | 0.105334E−03 | −.149365E−04 | 0.108879E−05 | 0.147724E−06 |
| 324 | −.134111E−03 | 0.205719E−04 | −.306767E−05 | 0.861599E−07 | 0.730964E−07 |
| 412 | −.784202E−05 | 0.582938E−06 | −.242367E−07 | 0.484472E−09 | −.207707E−11 |
| 414 | −.520433E−05 | 0.179675E−06 | 0.155635E−09 | −.215077E−09 | 0.710801E−11 |

Referring to FIGS. 4A to 4C and Tables 5 to 7, a zoom optical system includes a first lens group 100, a second lens group 200, a third lens group 300, and a fourth lens group 400 which are sequentially disposed in a direction from an object side to an image side. The first lens group 100 includes the first lens 110, the second lens 120, and a third lens 130 which are sequentially disposed in the direction from the object side to the image side, the second lens group 200 includes a fourth lens 210 and a fifth lens 220 which are sequentially disposed in the direction from the object side to the image side, the third lens group 300 includes a sixth lens 310 and a seventh lens 320 which are sequentially disposed in the direction from the object side to the image side, and the fourth lens group 400 includes an eighth lens 410. In this case, the first lens 110 may include the convex object side surface 112 and the concave image side surface 114, the second lens 120 may include the convex object side surface 122 and a convex image side surface 124, and the third lens 130 may include a concave object side surface 132 and a concave image side surface 134.

In addition, the fourth lens 210 may include a convex object side surface 212 and a convex image side surface 214, and the fifth lens 220 may include a convex object side surface 222 and a concave image side surface 224.

In addition, the sixth lens 310 may include a concave object side surface 312 and a convex image side surface 314, and the seventh lens 320 may include a concave object side surface 322 and the concave image side surface 324.

In addition, the eighth lens 410 may include a convex object side surface 412 and a convex image side surface 414.

In FIG. 4A, in a case in which a distance between the first lens group 100 and the second lens group 200 is d1a, a distance between the second lens group 200 and the third lens group 300 is d2a, and a distance between the third lens group 300 and the fourth lens group 400 is d3a, for example, a magnification may be 5 times in the wide-angle. In addition, when the second lens group 200 and the third lens group 300 are moved to be closer to the first lens group 100 as illustrated in FIGS. 4B and 4C, the distance between the first lens group 100 and the second lens group 200 may decrease to d1c, the distance between the second lens group 200 and the third lens group 300 may decrease to d2c, and the distance between the third lens group 300 and the fourth lens group 400 may decrease to d3c so that, for example, the magnification may be 7.5 times in the telephoto. As described above, as the second lens group 200 and the third lens group 300 are moved, the magnification of the zoom optical system may be continuously adjusted from 5 times to 7.5 times.

In this case, it may be seen that a movement amount of the third lens group 300 is greater than a movement amount of the second lens group 200. That is, a difference value between d1a and d1b may be less than a difference value between d2a and d2b, and a difference value between d1b and d1c may be less than a difference value between d2b and d2c.

FIG. 5A is a graph showing longitudinal spherical aberrations, astigmatic field curves, and a distortion in the optical system in the wide-angle for light of wavelengths of 435 nm, 486 nm, 546 nm, 587 nm, and 656 nm according to the second embodiment, FIG. 5B is a graph showing the longitudinal spherical aberrations, the astigmatic field curves, and the distortion in the optical system in the middle mode for the light of wavelengths of 435 nm, 486 nm, 546 nm, 587 nm, and 656 nm according to the second embodiment, and FIG. 5C is a graph showing the longitudinal spherical aberrations, the astigmatic field curves, and the distortion in the optical system in the telephoto for the light of wavelengths of 435 nm, 486 nm, 546 nm, 587 nm, and 656 nm according to the second embodiment.

The longitudinal spherical aberration refers to a longitudinal spherical aberration according to each wavelength, the astigmatic field curve refers to an aberration property of a tangential plane and a sagittal plane according to a height of an image surface, and the distortion refers to a distortion degree according to the height of the image surface. Referring to FIGS. 5A to 5C, it may be seen that the longitudinal spherical aberration ranges from −0.05 mm to 0.05 mm regardless of the wavelength, the astigmatic field curves ranges from −0.05 mm to 0.05 mm regardless of the wavelength, and the distortion ranges from −0.05 mm to 0.05 mm regardless of the wavelength.

FIG. 6A is a cross-sectional view illustrating a zoom optical system in a wide-angle according to a third embodiment of the present invention, FIG. 6B is a cross-sectional view illustrating the zoom optical system in a middle mode according to the third embodiment of the present invention, and FIG. 6C is a cross-sectional view illustrating the zoom optical system in a telephoto according to the third embodiment of the present invention.

Table 8 below shows optical properties of lenses included in the zoom optical system according to the third embodiment of the present invention, and Tables 9 and 10 show Koenig constants and aspheric coefficients of the lenses included in the zoom optical system according to the third embodiment of the present invention.

TABLE 8

| Lens No. | Lens Surface No. | Radius of Curvature (R, mm) | Thickness (mm) | Product Name |
|---|---|---|---|---|
| First Lens | 112 | 5.097030 | 1.253856 | APL5514 |
|  | 114 | 7.857320 | 0.350241 |  |
| Second Lens | 122 | 7.108600 | 1.522042 | K26R |
|  | 124 | 43.073500 | 0.523058 |  |

TABLE 8-continued

| Lens No. | Lens Surface No. | Radius of Curvature (R, mm) | Thickness (mm) | Product Name |
|---|---|---|---|---|
| Third Lens | 132 | −651.708320 | 0.470394 | APL5514 |
|  | 134 | 2.793470 | 2.820965 |  |
| Fourth Lens | 212 | 3.278280 | 1.802226 | MFCD1_HOYA |
|  | 214 | −8.365600 | 0.551424 |  |
| Fifth Lens | 222 | −101.347450 | 0.400000 | EP10000 |
|  | 224 | 13.134370 | 2.006039 |  |
| Sixth Lens | 312 | −69.866690 | 2.305291 | EP8000 |
|  | 314 | −4.728950 | 0.359420 |  |
| Seventh Lens | 322 | −7.112450 | 0.536365 | MTAF105_HOYA |
|  | 324 | 3.089440 | 1.942594 |  |
| Eighth Lens | 412 | 16.652360 | 2.156084 | APL5514 |
|  | 422 | −5.416600 | 0.271341 |  |

Here, a thickness (mm) denotes a distance from a lens surface to the next lens surface. For example, a thickness written to correspond to an object side surface 112 of a first lens 110 denotes a distance from the object side surface 112 of the first lens 110 to an image side surface 114. In addition, a thickness written to correspond to the image side surface 114 of the first lens 110 denotes a distance from the image side surface 114 of the first lens 110 to an object side surface 122 of a second lens 120.

TABLE 9

| Lens Surface No. | Koenig Constant K | A | B | C | D |
|---|---|---|---|---|---|
| 112 | 0.040970 | 0.564206E−03 | −.701041E−04 | 0.372201E−04 | 0.473374E−05 |
| 114 | −15.927382 | 0.284819E−02 | −.150457E−02 | 0.133982E−02 | −.614050E−03 |
| 122 | −14.598188 | 0.561260E−03 | −.169353E−02 | 0.157852E−02 | −.776495E−03 |
| 124 | 233.685102 | −.969064E−03 | −.100350E−02 | 0.585719E−03 | −.363682E−03 |
| 132 | 292.233524 | −.859387E−02 | 0.322069E−03 | −.568508E−04 | −.613193E−04 |
| 134 | −3.377254 | 0.156782E−02 | −.330049E−03 | −.224757E−03 | 0.274012E−03 |
| 212 | −0.171496 | −.644767E−03 | −.391850E−04 | 0.266498E−04 | −.162638E−04 |
| 214 | −19.231487 | −.388462E−03 | −.318176E−04 | 0.672108E−03 | −.473756E−03 |
| 222 | −300.000000 | 0.403937E−02 | 0.110254E−02 | 0.825171E−03 | −.797400E−03 |
| 224 | 40.712555 | 0.407975E−02 | 0.186452E−02 | 0.131785E−02 | −.238809E−03 |
| 312 | −300.000000 | 0.398545E−02 | −.959932E−03 | 0.385485E−03 | −.132270E−03 |
| 314 | −20.855634 | −.623139E−02 | −.261407E−02 | 0.114112E−02 | −.184006E−03 |
| 322 | 6.106662 | −.423587E−01 | 0.880403E−02 | −.149429E−02 | 0.112840E−02 |
| 324 | −9.918915 | −.276326E−01 | 0.119730E−01 | −.336143E−02 | 0.830857E−03 |
| 412 | 24.195976 | −.164485E−02 | 0.515061E−03 | −.269211E−03 | 0.591210E−04 |
| 414 | −74.787669 | −.864015E−02 | 0.213091E−02 | −.499466E−03 | 0.683422E−04 |

TABLE 10

| Lens Surface No. | E | F | G | H | J |
|---|---|---|---|---|---|
| 112 | −.714265E−05 | 0.202649E−05 | −.266211E−06 | 0.169373E−07 | −.420208E−09 |
| 114 | 0.158199E−03 | −.240158E−04 | 0.209287E−05 | −.951616E−07 | 0.172334E−08 |
| 122 | 0.220341E−03 | −.380106E−04 | 0.389013E−05 | −.215104E−06 | 0.493749E−08 |
| 124 | 0.126508E−03 | −.262340E−04 | 0.335947E−05 | −.243997E−06 | 0.757663E−08 |
| 132 | 0.483105E−04 | −.126406E−04 | 0.173072E−05 | −.133938E−06 | 0.475785E−08 |
| 134 | −.115636E−03 | 0.303163E−04 | −.508713E−05 | 0.478294E−06 | −.186669E−07 |
| 212 | 0.576576E−05 | −.127222E−05 | 0.159809E−06 | −.123971E−07 | 0.392120E−09 |
| 214 | 0.180872E−03 | −.425388E−04 | 0.597672E−05 | −.459161E−06 | 0.148473E−07 |
| 222 | 0.349799E−03 | −.937866E−04 | 0.145014E−04 | −.112990E−05 | 0.345497E−07 |
| 224 | 0.107452E−03 | −.303344E−04 | 0.391800E−05 | −.582440E−07 | −.176018E−07 |
| 312 | 0.280354E−04 | −.243375E−05 | −.694093E−09 | 0.210113E−08 | −.391643E−09 |

TABLE 10-continued

| Lens Surface No. | E | F | G | H | J |
|---|---|---|---|---|---|
| 314 | 0.895942E−05 | 0.218769E−06 | 0.332082E−07 | −.680646E−09 | −.383005E−10 |
| 322 | −.493882E−03 | 0.105334E−03 | −.149365E−04 | 0.108879E−05 | 0.147724E−06 |
| 324 | −.154524E−03 | 0.205719E−04 | −.306767E−05 | 0.861599E−07 | 0.730964E−07 |
| 412 | −.793814E−05 | 0.590596E−06 | −.223770E−07 | 0.448112E−09 | −.206336E−10 |
| 414 | −.534856E−05 | 0.186194E−06 | 0.994976E−09 | −.196388E−09 | −.405652E−12 |

Referring to FIGS. 6A to 6C and Tables 8 to 10, a zoom optical system includes a first lens group 100, a second lens group 200, a third lens group 300, and a fourth lens group 400 which are sequentially disposed in a direction from an object side to an image side. The first lens group 100 includes the first lens 110, the second lens 120, and a third lens 130 which are sequentially disposed in the direction from the object side to the image side, the second lens group 200 includes a fourth lens 210 and a fifth lens 220 which are sequentially disposed in the direction from the object side to the image side, the third lens group 300 includes a sixth lens 310 and a seventh lens 320 which are sequentially disposed in the direction from the object side to the image side, and the fourth lens group 400 includes an eighth lens 410. In this case, the first lens 110 may include the convex object side surface 112 and the concave image side surface 114, the second lens 120 may include the convex object side surface 122 and a convex image side surface 124, and the third lens 130 may include a concave object side surface 132 and a concave image side surface 134.

In addition, the fourth lens 210 may include a convex object side surface 212 and a convex image side surface 214, and the fifth lens 220 may include a convex object side surface 222 and a concave image side surface 224.

In addition, the sixth lens 310 may include a convex object side surface 312 and a convex image side surface 314, and the seventh lens 320 may include a concave object side surface 322 and the concave image side surface 324.

In addition, the eighth lens 410 may include a convex object side surface 412 and a convex image side surface 414.

In FIG. 6A, in a case in which a distance between the first lens group 100 and the second lens group 200 is d1a, a distance between the second lens group 200 and the third lens group 300 is d2a, and a distance between the third lens group 300 and the fourth lens group 400 is d3a, for example, a magnification may be 5 times in the wide-angle. In addition, when the second lens group 200 and the third lens group 300 are moved to be closer to the first lens group 100 as illustrated in FIGS. 6B and 6C, the distance between the first lens group 100 and the second lens group 200 may decrease to d1c, the distance between the second lens group 200 and the third lens group 300 may decrease to d2c, and the distance between the third lens group 300 and the fourth lens group 400 may decrease to d3c so that, for example, the magnification may be 7.5 times in the telephoto. As described above, as the second lens group 200 and the third lens group 300 are moved, the magnification of the zoom optical system may be continuously adjusted from 5 times to 7.5 times.

In this case, it may be seen that a movement amount of the third lens group 300 is greater than a movement amount of the second lens group 200. That is, a difference value between d1a and d1b may be less than a difference value between d2a and d2b, and a difference value between d1b and d1c may be less than a difference value between d2b and d2c.

FIG. 7A is a graph showing longitudinal spherical aberrations, astigmatic field curves, and a distortion in the optical system in the wide-angle for light of wavelengths of 435 nm, 486 nm, 546 nm, 587 nm, and 656 nm according to the third embodiment, FIG. 7B is a graph showing the longitudinal spherical aberrations, the astigmatic field curves, and the distortion in the optical system in the middle mode for the light of wavelengths of 435 nm, 486 nm, 546 nm, 587 nm, and 656 nm according to the third embodiment, and FIG. 7C is a graph showing the longitudinal spherical aberrations, the astigmatic field curves, and the distortion in the optical system in the telephoto for the light of wavelengths of 435 nm, 486 nm, 546 nm, 587 nm, and 656 nm according to the third embodiment.

The longitudinal spherical aberration refers to a longitudinal spherical aberration according to each wavelength, the astigmatic field curve refers to an aberration property of a tangential plane and a sagittal plane according to a height of an image surface, and the distortion refers to a distortion degree according to the height of the image surface. Referring to FIGS. 7A to 7C, it may be seen that the longitudinal spherical aberration ranges from −0.05 mm to 0.05 mm regardless of the wavelength, the astigmatic field curves ranges from −0.05 mm to 0.05 mm regardless of the wavelength, and the distortion ranges from −0.05 mm to 0.05 mm regardless of the wavelength.

As described above with reference to the embodiments, it may be seen that the optical system according to the embodiment of the present invention has high aberration properties.

Meanwhile, the zoom optical system according to the embodiment of the present invention may be applied to the camera module. The camera module including the zoom optical system according to one embodiment of the present invention may be installed in a portable terminal and applied thereto with a main camera module. The camera module according to the embodiment of the present invention may include the image sensor, the filter disposed on the image sensor, and the zoom optical system disposed on the filter, and the zoom optical system according to the embodiment of the present invention may include the first lens group 100, the second lens group 200, the third lens group 300, and the fourth lens group 400 which are described above. The portable terminal, in which the camera module including the zoom optical system according to the embodiment of the present invention is installed, may be a smartphone, a tablet personal computer (PC), a laptop computer, a personal digital assistant (PDA), or the like.

Meanwhile, the optical system according to the embodiment of the present invention may be applied to the camera module. FIG. 8 is a view illustrating a portion of a portable terminal to which the camera module according to one embodiment of the present invention is applied.

Referring to FIG. 8, a camera module including a zoom optical system 1000 according to one embodiment of the present invention may be installed in a portable terminal and may be applied thereto with a main camera module 1100.

The zoom optical system 1000 according to the embodiment of the present invention may include the first lens group 100, the second lens group 200, the third lens group 300, and the fourth lens group 400 which are described above, and the first lens group 100, the second lens group 200, the third lens group 300, and the fourth lens group 400 may be sequentially disposed in a lateral direction of the portable terminal due to a limit of a thickness of the portable terminal. To this end, as described above, a right-angled prism may be further disposed in front of the first lens group 100. When the zoom optical system is disposed in a thickness direction of the portable terminal, that is, the lens surfaces of the lenses included in the zoom optical system are disposed in the thickness direction of the portable terminal, diameters of the lenses included in the zoom optical system may be decreased to decrease the thickness of the portable terminal. Accordingly, the zoom optical system allowing a magnification to be continuously adjusted by moving the lenses may also be installed in the portable terminal.

The portable terminal, in which the camera module including the zoom optical system according to the embodiment of the present invention is installed, may be a smartphone, a tablet PC, a laptop computer, a PDA, or the like.

FIG. 9 is a view illustrating a camera module including the zoom optical system according to the embodiment of the present invention.

Referring to FIG. 9, a camera module 2000 including the zoom optical system according to the embodiment of the present invention may be implemented to have a hexahedron shape. A width w of the camera module 2000 may be greater than 13.10 mm and less than 14.50 mm. The width w of the camera module 2000 may be 13.80 mm. A length l of the camera module 2000 may be greater than 27.00 mm and less than 30.00 mm. The length l of the camera module 2000 may be 28.5 mm. A height h of the camera module 2000 may be greater than 5.80 mm and less than 6.60 mm. The height h of the camera module 2000 may be 6.2 mm.

The camera module 2000 including the zoom optical system according to the embodiment of the present invention may include an image sensor. A size of the image sensor may be greater than 0.30 inches and less than 0.34 inches. According to the embodiment, the size of the image sensor may be 1/3.14 inches.

The camera module 2000 including the zoom optical system according to the embodiment of the present invention may include an actuator. The actuator may be coupled to the zoom optical system to move at least one lens group included in the zoom optical system. In addition, the actuator may be coupled to the zoom optical system to move a prism. The actuator may include at least one of a pin member and a ball member.

In addition, the camera module 2000 including the zoom optical system according to the embodiment of the present invention may include a driver integrated circuit (IC), a printed circuit board, and the like.

The camera module 2000 including the zoom optical system according to the embodiment of the present invention may have a first field of view (FoV) in a wide-angle, and a second FoV in a telephoto. The first FoV may have a value greater than 17.70° and less than 19.70°. The first FoV may be 18.7°. The second FoV may have a value greater than 11.80 and less than 13.20°. The first FoV may be 12.5°.

The camera module 2000 including the zoom optical system according to the embodiment of the present invention may have a first f-number in the wide-angle and a second f-number in the telephoto. The first f-number may have a value greater than 2.80 and less than 3.20. The first f-number may be 3.0. The second f-number may have a value greater than 4.20 and less than 4.80. The second f-number may be 4.5.

While the present invention has been mainly described above with reference to the embodiments, it will be understood by those skilled in the art that the invention is not limited to the embodiments, but the embodiments are only exemplary, and various modifications and applications which are not illustrated above may be made within the range of the present invention without departing from the essential features of the present embodiments. For example, components specifically described in the embodiments may be modified and implemented. In addition, it should be understood that differences related to modifications and applications fall within the scope of the present invention defined by the appended claims.

The invention claimed is:

1. A zoom optical system comprising a first lens group, a second lens group, a third lens group, and a fourth lens group which are sequentially disposed in a direction from an object side to an image side,
   wherein the second lens group and the third lens group are movable,
   wherein a total track length (TTL) is less than 20 mm,
   wherein an effective focal length (EFL) in a telephoto is greater than 25 mm, and
   wherein a movement stroke of the second lens group is less than 2.5 mm during zooming from a wide-angle to the telephoto.

2. The zoom optical system of claim 1, wherein the EFL in the telephoto is greater than 1.5 times the EFL in the wide-angle.

3. The zoom optical system of claim 1, wherein the second lens group and the third lens group include at least one glass lens.

4. The zoom optical system of claim 3, wherein the glass lens has:
   a refractive index greater than 1.7; or
   an Abbe number greater than 60.

5. The zoom optical system of claim 1, wherein lenses included in the first lens group to fourth lens group include D-cut lenses.

6. The zoom optical system of claim 5, wherein the second lens group and the third lens group include a lens in which a value obtained by dividing a length of a long axis of an effective diameter by a length of a short axis of the effective diameter length is one.

7. The zoom optical system of claim 1, wherein a chief ray angle (CRA) is less than 6°.

8. The zoom optical system of claim 1, further comprising a right-angled prism sequentially disposed in front of the first lens group in the direction from the object side to the image side.

9. The zoom optical system of claim 1, wherein a value obtained by dividing the EFL by an f-number is greater than 6 in the telephoto.

10. The zoom optical system of claim 1, wherein, in the telephoto, an f-number is less than 4.2.

11. The zoom optical system of claim 1, wherein:
   the first lens group includes a first lens, a second lens and a third lens which are sequentially disposed in the direction from the object side to the image side,
   the second lens group includes a fourth lens and a fifth lens which are sequentially disposed in the direction from the object side to the image side, the third lens group includes a sixth lens and a seventh lens which are sequentially disposed in the direction from the object side to the image side, and the fourth lens group includes an eighth lens.

12. The zoom optical system of claim 11, wherein:

the first lens has positive refractive power, the second lens has positive refractive power, the third lens has negative refractive power, the fourth lens has positive refractive power, the fifth lens has negative refractive power, the sixth lens has positive refractive power, the seventh lens has negative refractive power, and the eighth lens has positive refractive power.

13. The zoom optical system of claim 12, wherein:

the first lens includes a convex object side surface and a concave image side surface, the second lens includes a convex object side surface and a convex image side surface, the third lens includes a concave object side surface and a concave image side surface, the fourth lens includes a convex object side surface and a convex image side surface, the fifth lens includes a convex object side surface and a concave image side surface, the sixth lens includes a convex object side surface and a convex image side surface, the seventh lens includes a concave object side surface and a concave image side surface, and the eighth lens includes a convex object side surface and a convex image side surface.

14. The zoom optical system of claim 12, wherein:

the first lens includes a convex object side surface and a concave image side surface, the second lens includes a convex object side surface and a convex image side surface, the third lens includes a concave object side surface and a concave image side surface, the fourth lens includes a convex object side surface and a convex image side surface, the fifth lens includes a convex object side surface and a concave image side surface, the sixth lens includes a concave object side surface and a convex image side surface, the seventh lens includes a concave object side surface and a concave image side surface, and the eighth lens includes a convex object side surface and a convex image side surface.

15. The zoom optical system of claim 1, wherein each of the second lens group and the third lens group moves independently.

16. The zoom optical system of claim 15, wherein the second lens group is a zooming group, and the third lens group is a focusing group.

17. The zoom optical system of claim 15, wherein a movement amount of the third lens group is greater than a movement amount of the second lens group.

18. A zoom optical system comprising a first lens group, a second lens group, a third lens group, and a fourth lens group which are sequentially disposed in a direction from an object side to an image side, wherein the second lens group and the third lens group are movable, wherein in a telephoto, an effective focal length (EFL) is greater than 25 mm, and an f-number is less than 4.2, wherein the first lens group includes a first lens, a second lens and a third lens which are sequentially disposed in the direction from the object side to the image side, and wherein the first lens has a positive refractive power.

19. A zoom optical system comprising a first lens group, a second lens group, a third lens group, and a fourth lens group which are sequentially disposed in a direction from an object side to an image side, wherein the second lens group and the third lens group are movable, wherein a value obtained by dividing an effective focal length (EFL) by an f-number is greater than 6 in a telephoto, wherein the first lens group includes a first lens, a second lens and a third lens which are sequentially disposed in the direction from the object side to the image side, and wherein the first lens has a positive refractive power.

* * * * *